United States Patent
Shinohara et al.

(10) Patent No.: US 10,674,483 B2
(45) Date of Patent: Jun. 2, 2020

(54) WIRELESS COMMUNICATION SYSTEM, WIRELESS COMMUNICATION METHOD, WIRELESS LAN ACCESS POINT, AND WIRELESS LAN STATION

(71) Applicant: NIPPON TELEGRAPH AND TELEPHONE CORPORATION, Tokyo (JP)

(72) Inventors: Shoko Shinohara, Yokosuka (JP); Yasuhiko Inoue, Yokosuka (JP); Yasushi Takatori, Yokosuka (JP); Koichi Ishihara, Yokosuka (JP); Yusuke Asai, Yokosuka (JP); Masato Mizoguchi, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/553,678

(22) PCT Filed: Mar. 4, 2016

(86) PCT No.: PCT/JP2016/056896
§ 371 (c)(1),
(2) Date: Aug. 25, 2017

(87) PCT Pub. No.: WO2016/143718
PCT Pub. Date: Sep. 15, 2016

(65) Prior Publication Data
US 2018/0054810 A1 Feb. 22, 2018

(30) Foreign Application Priority Data
Mar. 6, 2015 (JP) .................. 2015-044929

(51) Int. Cl.
*H04W 72/04* (2009.01)
*H04W 84/12* (2009.01)

(52) U.S. Cl.
CPC ....... *H04W 72/0406* (2013.01); *H04W 72/04* (2013.01); *H04W 72/0453* (2013.01); *H04W 84/12* (2013.01)

(58) Field of Classification Search
CPC .................................................. H04W 72/0406
See application file for complete search history.

(56) References Cited

U.S. PATENT DOCUMENTS

| | | |
|---|---|---|
| 2008/0031191 A1 | 2/2008 | Kashima et al. |
| 2010/0085950 A1 | 4/2010 | Sekiya et al. |

(Continued)

FOREIGN PATENT DOCUMENTS

| | | |
|---|---|---|
| JP | H09-065414 A | 3/1997 |
| JP | 2010093489 A | 4/2010 |

(Continued)

OTHER PUBLICATIONS

Japanese Office Action in parallel application JP 2017-505315, JPO, dated Jun. 26, 2018, with machine translation thereof.

(Continued)

*Primary Examiner* — Jason E Mattis
(74) *Attorney, Agent, or Firm* — Harness, Dickey & Pierce, P.L.C.

(57) ABSTRACT

In a wireless communication system in which an AP and a plurality of STAs are connected to each other and the AP simultaneously transmits a wireless frame destined for each STA with FDMA, in which the AP includes a control frame transmission unit that generates a control frame having information on a frequency resource allocated to the each STA and transmits the control frame on a primary channel being used in a shared manner by the each STA and a (Continued)

wireless frame transmission unit that simultaneously transmits the wireless frame destined for the each STA on the frequency resource allocated to the each STA, and in which the STA includes a frequency resource selection reception unit that receives the control frame on the primary channel and receives a wireless frame destined for the STA itself on a frequency resource notified by the control frame.

13 Claims, 16 Drawing Sheets

(56) References Cited

U.S. PATENT DOCUMENTS

| | | |
|---|---|---|
| 2015/0172012 A1 | 6/2015 | Abeysekera et al. |
| 2015/0188675 A1 | 7/2015 | Abeysekera et al. |
| 2016/0050052 A1* | 2/2016 | Suh .................. H04L 27/2613 370/330 |
| 2016/0050622 A1* | 2/2016 | Azizi ............... H04W 52/0216 370/311 |
| 2016/0174200 A1* | 6/2016 | Seok ................... H04W 72/04 370/329 |
| 2017/0223693 A1* | 8/2017 | Kim ..................... H04L 27/26 |
| 2017/0250847 A1* | 8/2017 | Li ...................... H04B 7/0452 |
| 2018/0198591 A1* | 7/2018 | Stacey ................ H04L 5/0091 |

FOREIGN PATENT DOCUMENTS

| | | |
|---|---|---|
| WO | WO-2008/015543 A2 | 2/2008 |
| WO | WO-2014/014084 A1 | 1/2014 |
| WO | WO-2014014094 A1 | 1/2014 |

OTHER PUBLICATIONS

NPL D1: IEEE 11-14/1382r0, Response to the comments on doc 1169r0, Oct. 30, 2014.
NPL D2: IEEE 11-14/1169r0, DL-FDMA considerations, Sep. 12, 2014.
NPL D3: IEEE 802.11-10/0317r0, DL-OFDMA for Mixed Clients, Mar. 6, 2010.
International Preliminary Report on Patentability, IB, Geneva, dated Sep. 12, 2017, with translation thereof, incorporating the English translation of the Written Opinion of the ISA/JP, Tokyo, dated May 24, 2016.
Preamble structure for 11ax system, IEEE 802.11-15/0101r1, [online], Jan. 12, 2015, [retrieval date: May 16, 2016].
Discussion on Frame Structure for Future WLAN Systems with OFDMA, IEEE 802.11-14/ 1397r1, [online], Oct. 31, 2014, [retrieval date: May 16, 2016].
Robert Stacey, et al,; "Proposed Specification Framework for TGax"; doc.: IEEE 802.11-14/1453r2.
Koichi Ishihara, et al.; "Simultaneous Transmission Technologies for HEW"; doc.: IEEE 11-13/1395r2.
"Part 11: Wireless LAN Medium Access Control (MAC) and Physical (PHY) Layer Specifications"; IEEE Std 802.11™-2012.
International Search Report for PCT/JP2016/056896, ISA/JP, Tokyo, dated May 24, 2016.
Written Opinion of the ISA for PCT/JP2016/056896, ISA/JP, Tokyo, dated May 24, 2016.
Extended European Search Report for counterpart application EP 16761688.7, EPO, Munich, dated Oct. 1, 2018.
Richard Van Nee (Qualcomm): "Strawmodel 802.11 ac Specification Framework; 11-09-0633-00-00ac-strawmodel-802-11ac-specification-framework", IEEE Draft; 11-09-0633-00-00AC-Strawmodel-02-11AC-Specification-Framework, IEEE-SA Mentor, Piscataway, NJ USA, vol. 802,11ac, May 14, 2009 (May 14, 2009), pp. 1-30, XP017678860, [retrieved on May 14, 2009].
Indian Office Action regarding IN201717030027, dated Oct. 30, 2019.

* cited by examiner

L-STA: Legacy standard-STA
N-STA: New standard-STA
BA: Block Acknowledge
BAR: Block Acknowledge Request
MCI: Multi-Channel indication

| FRAME CONTROL | DURATION | RA | TA | (FREQUENCY RESOURCE INFORMATION) | FCS |
|---|---|---|---|---|---|

L-STF: Legacy-Short training Field
L-LTF: Legacy-Long training Field
L-SIG: Legacy-SIGNAL Field HE-STF: High Efficiency-Short training Field
HE-LTF: High Efficiency-Long training Field
HE-SIG: High Efficiency-SIGNAL Field

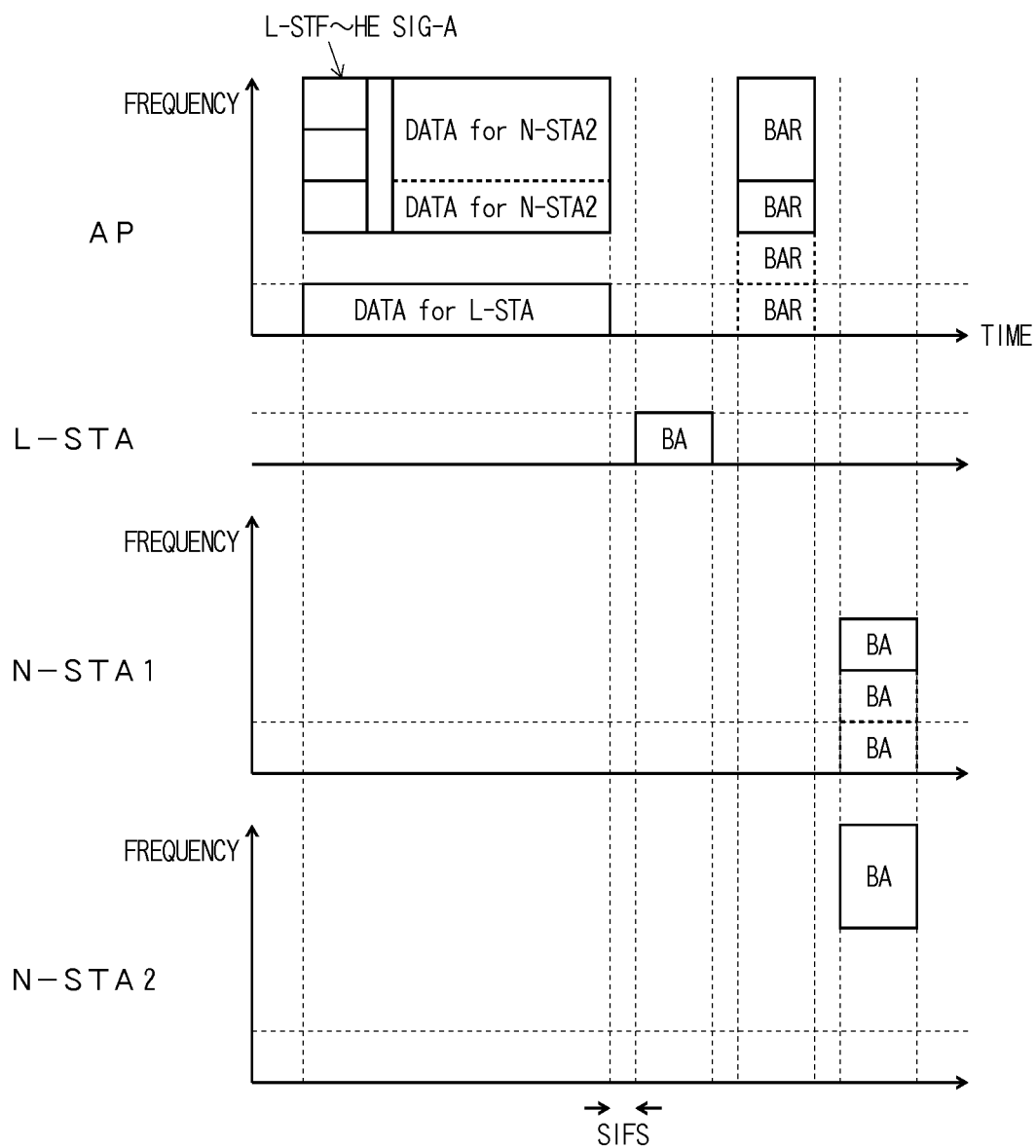
F I G. 1 8

L-STA: Legacy standard-STA
N-STA: New standard-STA
L-STF: Legacy-Short training Field
HE-SIG: High Efficiency-SIGNAL Field BA : Block Acknowledge
MU-BAR: Multi User-Block Acknowledge Request F I G. 2 1
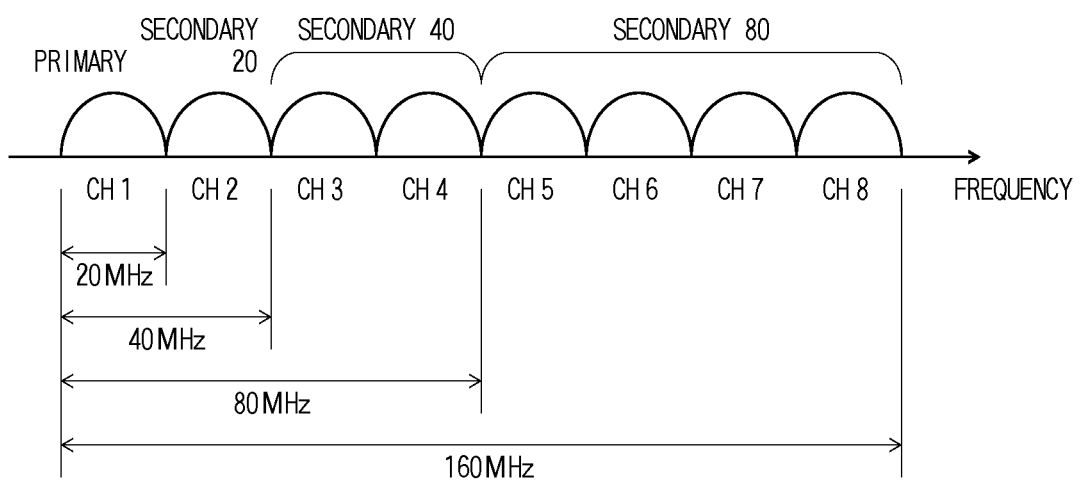

WIRELESS COMMUNICATION SYSTEM, WIRELESS COMMUNICATION METHOD, WIRELESS LAN ACCESS POINT, AND WIRELESS LAN STATION

CROSS REFERENCE TO RELATED APPLICATION

This application is a U.S. National Stage application claiming the benefit of prior filed International Application Number PCT/JP2016/056896, filed on Mar. 4, 2016, in which the International Application claims priority from Japanese Patent Application Number 2015-044929, filed on Mar. 6, 2015, the entire contents of which are incorporated herein by reference.

TECHNICAL FIELD

The present invention relates to a wireless communication system, a wireless communication method, a wireless LAN access point, and a wireless LAN station, in which the wireless LAN access point simultaneously transmits wireless frames that are destined for a plurality of wireless LAN stations, using Frequency Division Multiple Access (FDMA). In the present specification, the wireless LAN station is abbreviated as "STA", and the wireless LAN access point is abbreviated as "AP".

BACKGROUND ART

In a standard IEEE 802.11a in a wireless LAN system communication is performed using a frequency band of 20 MHz per one channel. In a standard IEEE 802.11n or later, a channel bonding function of bundling a plurality of channels and performing communication is further stipulated. In the standard IEEE 802.11n, a maximum of two channels are bundled according to a situation where a channel is idled, and thus the communication can be performed using a frequency band of 40 MHz. In a standard IEEE 802.11ac, a maximum of eight channels are bundled, and thus the communication can be performed using a frequency band of 160 MHz. For example, as illustrated in FIG. 21, a primary channel is set and other channels that are bundled for use are set as secondary channels. Here, an example is described in which CH1 is intended to be a primary channel and CH2 to CH8 are intended to be secondary channels. Starting of transmission and reception in the AP and the STA is determined by carrier-sensing a signal on the primary channel. Whether or not the use of the secondary channel is possible is decided by whether or not another wireless station is using the channel.

Furthermore, in the standard IEEE 802.11ac, in order to improve efficiency of communication in a downlink direction from the AP to the STA, Multi-user multiple input multiple output (MU-MIMO) to which Spatial Division Multiple Access applies is employed, and it is possible that different wireless frames that are destined for a plurality of STAs are simultaneously transmitted from the AP. Additionally, as disclosed in Non-Patent Document 1 and Non-Patent Document 2, in the wireless LAN system, in order to improve efficiency of access to many STAs, a technology in which the AP simultaneously transmits different wireless frames that are destined for a plurality of STAs using FDMA is considered.

However, in the STA that complies with the standard IEEE 802.11n or the standard IEEE 802.11ac, because transmission and reception necessarily needs to be performed using the primary channel, simultaneous transmissions that use FDMA may not be assumed. These STAs are referred to as legacy standard STAs. On the other hand, the STA in which the simultaneous transmissions that use FDMA are assumed is referred to as a new standard STA. Here, as illustrated in FIG. 1, when a legacy standard STA and new standard STA 1 to new standard STA 4 are connected to the AP, it is possible that new standard STAs or a combination of the legacy standard STA and the new standard STA performs the simultaneous transmissions that use FDMA. However, because the legacy standard STA necessarily uses the primary channel, the new standard STA is made to use a channel other than the primary channel.

FIG. 22 illustrates an example in which the AP performs the simultaneous transmissions that use FDMA to the legacy standard STA and the new standard STA. The present example is disclosed in Non-Patent Document 1. The new standard STA is expressed as a N-STA, and the legacy standard STA is expressed as a L-STA.

In FIG. 22, STAs that are connected to the AP correspond the following standards, respectively. An L-STA 1 (11a) supports only a primary channel CH1 in compliance with the standard IEEE 802.11a. An L-STA 2 (11n) supports the primary channel CH1 and a secondary channel CH2 in compliance with the standard IEEE 802.11n. An L-STA 3 (11ac) supports the primary channel CH1 and secondary channels CH2 to CH4 in compliance with the standard IEEE 802.11ac. However, because in these standards, the primary channel is necessarily used, the simultaneous transmissions that use FDMA are not assumed. However, in the standard IEEE 802.11ac, the simultaneous transmissions that use MU-MIMO are possible. On the other hand, it is assumed that an N-STA (11ax) complies with a new standard IEEE 802.11ax and, in addition to an IEEE 802.11ac function, performs the simultaneous transmissions which use FDMA.

With the configuration described above, the L-STAs cannot perform the simultaneous transmissions that use FDMA, but it is possible that a combination of the L-STA and the N-STA performs the simultaneous transmissions which use FDMA. However, when the transmission to a destination that is the N-STA is performed, a channel other than the primary channel CH1 is made to be used. In an example in FIG. 22, in the AP, a procedure in which pieces of transmission data that are destined for the L-STA 1 (11a) and the N-STA (11ax) occur and the simultaneous transmissions are performed is illustrated.

The AP transmits an RTS frame to a destination that is the N-STA (11ax), using all channels CH1 to CH4. The L-STA 1(11a), the L-STA 2 (11n), and the L-STA 3 (11ac) receive the RTS frame, which is not destined for the L-STA 1, the L-STA 2, and the L-STA 3 themselves, on the primary channel CH1, and set a NAV, a duration that is indicated in the RTS frame, for the primary channel CH1.

The N-STA (11ax) has a configuration in which carrier sense and demodulation are possible concurrently with each of the channels CH1 to CH4, and if the RTS frame in each channel, which results from the demodulation, is destined for the N-STA itself, returns the CTS frame to the AP using one or more, or all of the channels CH1 to CH4.

When receiving the CTS frame from the N-STA (11ax), the AP simultaneously transmits the data frame that is destined for the L-STA 1 (11a) and the N-STA (11ax), using FDMA. At this time, the AP performs the transmission to the L-STA 1 (11a), using only the primary channel CH1, and performs the transmission to the N-STA (11ax), using the channels CH3 and CH4, with the channel CH 2 being unoccupied as a guard band among the remaining channels CH2 to CH4.

When correctly receiving the data frame that is destined for each of the L-STA 1 (11a) and the N-STA (11ax) themselves, each of the L-STA 1 (11a) and the N-STA (11ax) replies with a block ACK (hereinafter referred to as a "BA") on the channel on which the reception is performed.

Patent Document 1: Pamphlet of International Publication No. 2014/014084

Non-Patent Document 1: "Proposed Specification Framework for TGax" Robert Stacey et al., doc.:IEEE 802.11-14/1453r2, 5 Nov. 2014

Non-Patent Document 2: "Simultaneous Transmission Technologies for HEW" Koichi Ishihara et al., doc.:IEEE 11-13/1395r2, 12 Nov. 2013

Non-Patent Document 3: The LAN/MAN Standards Committee, "IEEE Std 802.11™-2012 IEEE Standard for Information Technology—Telecommunications and information exchange between systems—Local and metropolitan area networks Specific requirements Part11: Wireless LAN Medium Access Control (MAC) and Physical Layer (PHY) Specifications" IEEE, 6 Feb. 2012

DISCLOSURE

Problems to be Solved

In the wireless LAN system, if the simultaneous transmissions are performed using FDMA in order to improve frequency utilization efficiency, as illustrated in FIG. 22, a combination of the L-STA (11a/11n/11ac) and the N-STA (11ax), as well as the N-STAs, is enabled to perform the simultaneous transmissions. If the simultaneous transmissions to the L-STA and the N-STA are performed, a channel other than the primary channel is allocated to a destination that is the N-STA, but there is a problem with a method of notifying the N-STA of the allocated channel.

In Non-Patent Document 1, a configuration in which it is possible that the N-STA receives, in parallel, wireless frames on the channels CH1 to CH4 that include the primary channel is assumed, and although there is no advance notification, the reception of the wireless frame that uses the secondary channel is made possible. That is, the L-STA and the N-STA have a configuration in which the wireless frames that are simultaneously transmitted using FDMA can be received on each of the channels.

However, if normally, the N-STA, like the L-STA, has a configuration in which the wireless frame in the primary channel is received, information indicating a frequency resource that is used for the simultaneous transmissions and a destination is not included in the wireless frame for the L-STA, which is transmitted on the primary channel. Therefore, although the N-STA receives the wireless frame in the primary channel, because there is no information on the frequency resource that is used in the N-STA itself, the wireless frame that is destined for the N-STA itself cannot be received. That is, if the N-STA has a configuration in which if there is no advance notification, the wireless frame in a channel other than the primary channel is not received, the simultaneous transmissions that use a frequency resource other than the primary channel cannot be made to be performed. Furthermore, in the N-STA, no limitation to the secondary channel on a per-20 MHz band basis is imposed, and it is also considered that an arbitrary frequency resource other than the primary channel is allocated and the simultaneous transmissions are performed.

A proposition of the present invention is to provide a wireless communication system, a wireless communication method, a wireless LAN access point, and a wireless LAN station, in which an N-STA is enabled to obtain information on a frequency resource that is used for simultaneous transmissions directly or indirectly from a wireless frame in a primary channel and in which a plurality of N-STAs or a combination of an L-STA and an N-STA is enabled to perform the simultaneous transmissions that use FDMA.

Means for Solving the Problems

According to a first invention, there is provided a wireless communication system in which an AP and a plurality of STAs are connected to each other and the AP simultaneously transmits a wireless frame destined for each STA with frequency division multiple access, in which the AP includes a control frame transmission unit that generates a control frame having information on a frequency resource allocated to the each STA and transmits the control frame on a primary channel being used in a shared manner by the each STA and a wireless frame transmission unit that simultaneously transmits the wireless frame destined for the each STA on the frequency resource allocated to the each STA, and in which the STA includes a frequency resource selection reception unit that receives the control frame on the primary channel and receives a wireless frame destined for the STA itself on a frequency resource notified by the control frame.

According to a second invention, there is provided a wireless communication system in which an AP and a plurality of STAs are connected to each other and the AP simultaneously transmits a wireless frame destined for each STA with frequency division multiple access, in which the AP includes a control frame transmission unit that generates a control frame having information on a subchannel on which the each STA receives a high efficiency preamble of the wireless frame and transmits the control frame on a primary channel being used in a shared manner by the each STA, and a wireless frame transmission unit that sets information on a frequency resource allocated to the each STA to the high efficiency preamble and simultaneously transmits the wireless frame destined for the each STA on the frequency resource allocated to the each STA, and in which the STA includes a frequency resource selection reception unit that receives the control frame on the primary channel, switches to the subchannel notified by the control frame, demodulates the high efficiency preamble of the wireless frame, and receives a wireless frame destined for the STA itself on a frequency resource notified by the high efficiency preamble.

According to a third invention, there is provided a wireless communication system in which an AP and a plurality of STAs are connected to each other and the AP simultaneously transmits a wireless frame destined for each STA with frequency division multiple access, in which the AP includes a subcarrier information notification unit that adds a subcarrier for information notification which is different from a prescribed subcarrier to a PHY preamble of a wireless frame in a primary channel being used in a shared manner by the each STA, and notifies information on a subchannel on which the each STA receives a high efficiency preamble of the wireless frame by the subcarrier for the information notification, and a wireless frame transmission unit that sets information on a frequency resource allocated to the each STA to the high efficiency preamble and simultaneously transmits the wireless frame destined for the each STA on the frequency resource allocated to the each STA, and in which the STA includes a frequency resource selection reception unit that detects the subcarrier for the information notification of the PHY preamble of the wireless frame in the primary channel, switches to the subchannel notified by the subcarrier for the information notification, demodulates the high efficiency preamble of the wireless frame, and receives a wireless frame destined for the STA itself on a frequency resource notified by the high efficiency preamble.

In the wireless communication system according to the third invention, the PHY preamble is configured with legacy standards an L-STF, an L-LTF, and an L-SIG and the subcarrier for the information notification is added to at least one field of the L-STF, the L-LTF, and the L-SIG.

In the wireless communication system according to the second or third invention, the high efficiency preamble of the wireless frame includes a first high efficiency preamble that is used for notification of a band in which the each STA demodulates the wireless frame, and a second high efficiency preamble that is used for notification of allocation of the frequency resource allocated to the each STA which is simultaneously transmitted with frequency multiplexing or spatial multiplexing, and the second high efficiency preamble is transmitted in a bandwidth of the subchannel or a full bandwidths used for the transmission of the wireless frame.

According to a fourth invention, there is provided a wireless communication method in which an AP and a plurality of STAs are connected to each other and the AP simultaneously transmits a wireless frame destined for each STA with frequency division multiple access, in which the AP includes a control frame transmission step generating a control frame having information on a frequency resource allocated to the each STA and transmitting the control frame on a primary channel being used in a shared manner by the each STA, and a wireless frame transmission step simultaneously transmitting the wireless frame destined for the each STA on the frequency resource allocated to the each STA, and in which the STA includes a frequency resource selection reception step receiving the control frame on the primary channel and receiving a wireless frame destined for the STA itself on a frequency resource notified by the control frame.

According to a fifth invention, there is provided a wireless communication method in which an AP a plurality of STAs are connected to each other and the AP simultaneously transmits a wireless frame destined for each STA with frequency division multiple access, in which the AP includes a control frame transmission step generating a control frame having information on a subchannel on which the each STA receives a high efficiency preamble of the wireless frame and transmitting the control frame on a primary channel being used in a shared manner by the each STA, and a wireless frame transmission step setting information on a frequency resource allocated to the each STA to the high efficiency preamble and simultaneously transmitting the wireless frame destined for the each STA on the frequency resource allocated to the each STA, and in which the STA includes a frequency resource selection reception step receiving the control frame on the primary channel, switching to the subchannel notified by the control frame, demodulating the high efficiency preamble of the wireless frame, and receiving a wireless frame destined for the STA itself on a frequency resource notified by the high efficiency preamble.

According to a sixth invention, there is provided a wireless communication method in which an AP and a plurality of STAs are connected to each other and the AP simultaneously transmits a wireless frame destined for each STA with frequency division multiple access, in which the AP includes a subcarrier information notification step adding a subcarrier for information notification which is different from a prescribed subcarrier to a PHY preamble of a wireless frame in a primary channel being used in a shared manner by the each STA, and notifying information on a subchannel on which the each STA receives a high efficiency preamble of the wireless frame by the subcarrier for the information notification, and a wireless frame transmission step setting information on a frequency resource allocated to the each STA to the high efficiency preamble and simultaneously transmitting the wireless frame destined for the each STA on the frequency resource allocated to the each STA, and in which the STA includes a frequency resource selection reception step detecting the subcarrier for the information notification of the PHY preamble of the wireless frame in the primary channel, switching to the subchannel notified by the subcarrier for the information notification, demodulating the high efficiency preamble of the wireless frame, and receiving a wireless frame destined for the STA itself on a frequency resource notified by the high efficiency preamble.

In the wireless communication method according to the sixth invention, the PHY preamble is configured with legacy standards an L-STF, an L-LTF, and an L-SIG and the subcarrier for the information notification is added to at least one field of the L-STF, the L-LTF, and the L-SIG.

In the wireless communication method according to the fifth or sixth invention, the high efficiency preamble of the wireless frame includes a first high efficiency preamble that is used for notification of a band in which the each STA demodulates the wireless frame and a second high efficiency preamble that is used for notification of allocation of the frequency resource allocated to the each STA which is simultaneously transmitted with frequency multiplexing or spatial multiplexing, and the second high efficiency preamble is transmitted in a bandwidth of the subchannel or a full bandwidths used for the transmission of the wireless frame.

According to a seventh invention, there is provided an AP in a wireless communication system in which the AP and a plurality of STAs are connected to each other and the AP simultaneously transmits a wireless frame destined for each STA with frequency division multiple access, the AP includes a control frame transmission unit that generates a control frame having information on a frequency resource allocated to the each STA and transmits the control frame on a primary channel being used in a shared manner by the each STA, and a wireless frame transmission unit that simultaneously transmits the wireless frame destined for the each STA on the frequency resource allocated to the each STA.

According to an eighth invention, there is provided an AP in a wireless communication system in which the AP and a plurality of STAs are connected to each other and the AP simultaneously transmits a wireless frame destined for each STA with frequency division multiple access, the AP includes a control frame transmission unit that generates a control frame having information on a subchannel on which the each STA receives a high efficiency preamble of the wireless frame and transmits the control frame on a primary channel being used in a shared manner by the each STA, and a wireless frame transmission unit that sets information on a frequency resource allocated to the each STA to the high efficiency preamble and simultaneously transmits the wireless frame destined for the each STA on the frequency resource allocated to the each STA.

According to a ninth invention, there is provided an AP in a wireless communication system in which the AP and a plurality of STAs are connected to each other and the AP simultaneously transmits a wireless frame destined for each STA with frequency division multiple access, the AP includes a subcarrier information notification unit that adds a subcarrier for information notification which is different from a prescribed subcarrier to a PHY preamble of a wireless frame in a primary channel being used in a shared manner by the each STA, and notifies information on a subchannel on which the each STA receives a high efficiency preamble of the wireless frame by the subcarrier for the information notification, and a wireless frame transmission unit that sets information on a frequency resource allocated to the each STA to the high efficiency preamble and simultaneously transmits the wireless frame destined for the each STA on the frequency resource allocated to the each STA.

According to a tenth invention, there is provided STAs in a wireless communication system in which an AP and a plurality of STAs are connected to each other and the AP simultaneously transmits a wireless frame destined for each of the STAs with frequency division multiple access, the STAs include a frequency resource selection reception unit that receives a control frame transmitted from the AP on a primary channel being used in a shared manner by the each of the wireless LAN stations and receives a wireless frame destined for the each of the wireless LAN stations itself on a frequency resource notified by the control frame.

According to an eleventh invention, there is provided STAs in a wireless communication system in which an AP and a plurality of STAs are connected to each other and the AP simultaneously transmits a wireless frame destined for each of the STAs with frequency division multiple access, the STAs include a frequency resource selection reception unit that receives a control frame transmitted from the AP on a primary channel being used in a shared manner by the each of the wireless LAN stations, switches to a subchannel notified by the control frame, demodulates a high efficiency preamble of the wireless frame, and receives a wireless frame destined for the each of the wireless LAN stations itself on a frequency resource notified by the high efficiency preamble.

According to a twelfth invention, there is provided STAs in a wireless communication system in which an AP and a plurality of STAs are connected to each other and the AP simultaneously transmits a wireless frame destined for each of the STAs with frequency division multiple access, the STAs include a frequency resource selection reception unit that detects a subcarrier for information notification of a PHY preamble of the wireless frame transmitted from the AP on a primary channel being used in a shared manner by the each of the wireless LAN stations, switches to a subchannel notified by the subcarrier for the information notification, demodulates a high efficiency preamble of the wireless frame, and receives a wireless frame destined for the each of the wireless LAN stations itself on a frequency resource notified by the high efficiency preamble.

Effects

According to the present invention, in an AP, frequency resource for wireless frames that are simultaneously transmitted to destinations that are a plurality of STAs, using FDMA, are set, and the frequency resources are notified to the STAs, respectively, using a control frame in a primary channel. In each STA, a wireless frame that is destined for the STA itself can be received on the frequency resource that is notified with the control frame in the primary channel.

According to the present invention, in the AP, the frequency resource for the wireless frames that are simultaneously transmitted to destinations that are a plurality of STAs, using FDMA, are set, and information on a subchannel for receiving a high efficiency preamble that notifies information on the frequency resource is notified to each STA, using the control frame in the primary channel. In each STA, the high efficiency preamble potion can be demodulated on a subchannel that is notified with the control frame in the primary channel, and the wireless frame that is destined for the STA itself can be received on the obtained frequency resource.

According to the present invention, in the AP, the frequency resource for the wireless frames that are simultaneously transmitted to destinations that are a plurality of STAs, using FDMA, are set, and the information on the subchannel for receiving the high efficiency preamble that notifies the information on the frequency resource is notified to each STA, using a subcarrier for information notification that is newly established for a PHY preamble of the wireless frame in the primary channel. In each STA, the high efficiency preamble can be demodulated on a subchannel that is notified on the subcarrier for the information notification in the primary channel, and the wireless frame that is destined for the STA itself can be received on the obtained frequency resource.

Accordingly, in each STA, with the control frame in the primary channel, or by monitoring the subcarrier for the information notification, of the PHY preamble of the wireless frame, a frequency resource on which a data frame that is destined for the STA itself is received can be determined, and the wireless frame that is destined for the STA itself can be received by performing switching from the primary channel to a channel that is indicated by the frequency resource.

BRIEF DESCRIPTION OF DRAWINGS

FIG. 18 is a diagram illustrating a second example of the BA transmission procedure in the wireless communication system according to the present invention.

FIG. 21 is a diagram illustrating an example of a primary channel and a secondary channel.

DETAILED DESCRIPTION OF THE EMBODIMENTS

Figure 1:
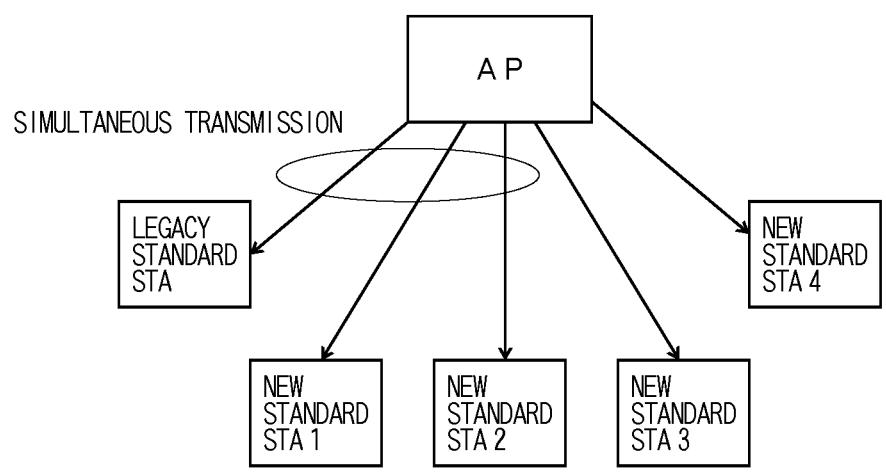
FIG. 1 is a diagram illustrating an example of a configuration of a wireless communication system according to the present invention.

FIG. 1 illustrates an example of a configuration of a wireless communication system according to the present invention.

In FIG. 1, a legacy standard STA that complies with legacy standards, for example, IEEE 802.11a, IEEE 802.11n, and IEEE 802.11ac and a new standard STA 1 to a new standard STA 4 that comply with a new standard, IEEE 802.11ax, are connected to an AP. In the following descriptions of embodiments, it is assumed that the AP performs simultaneous transmissions to new standard STAs or a combination of the legacy standard STA and the new standard STA, using FDMA.

Figure 2:
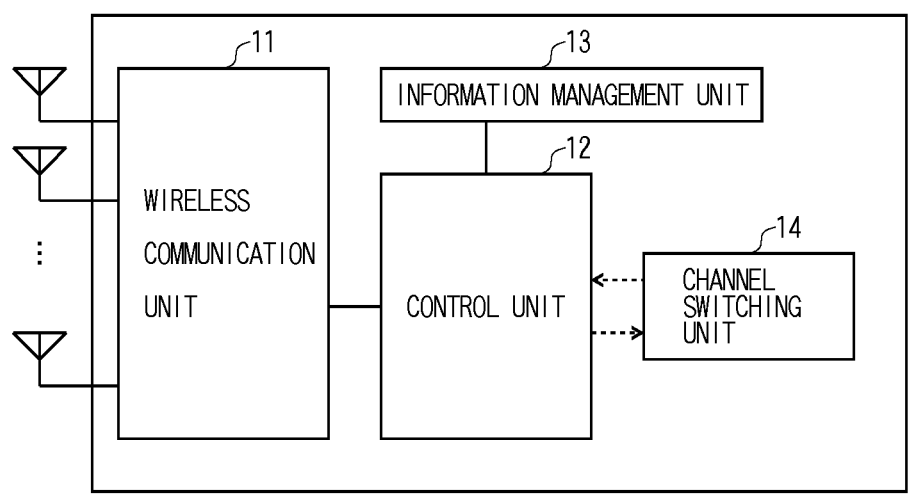
FIG. 2 is a diagram illustrating an example of a configuration of a new standard STA.

FIG. 2 illustrates an example of a configuration of the new standard STA.

In FIG. 2, the new standard STA is configured to include a wireless communication unit 11 that performs transmission and reception of a wireless frame, a control unit 12 that performs all controls of transmission and reception of the wireless frame, which include reception processing of the wireless frame that is simultaneously transmitted, and an information management unit 13 that manages information necessary for each control, and a channel switching unit 14. The channel switching unit 14 switches among a primary channel on which a wireless frame that is common to the legacy standard STA, a channel on which a wireless frame that is simultaneously transmitted, and a channel on which a wireless frame that is simultaneously transmitted through a subchannel on which a high efficiency preamble, which will be described below, is received.

(Embodiment 1)

Figure 3:
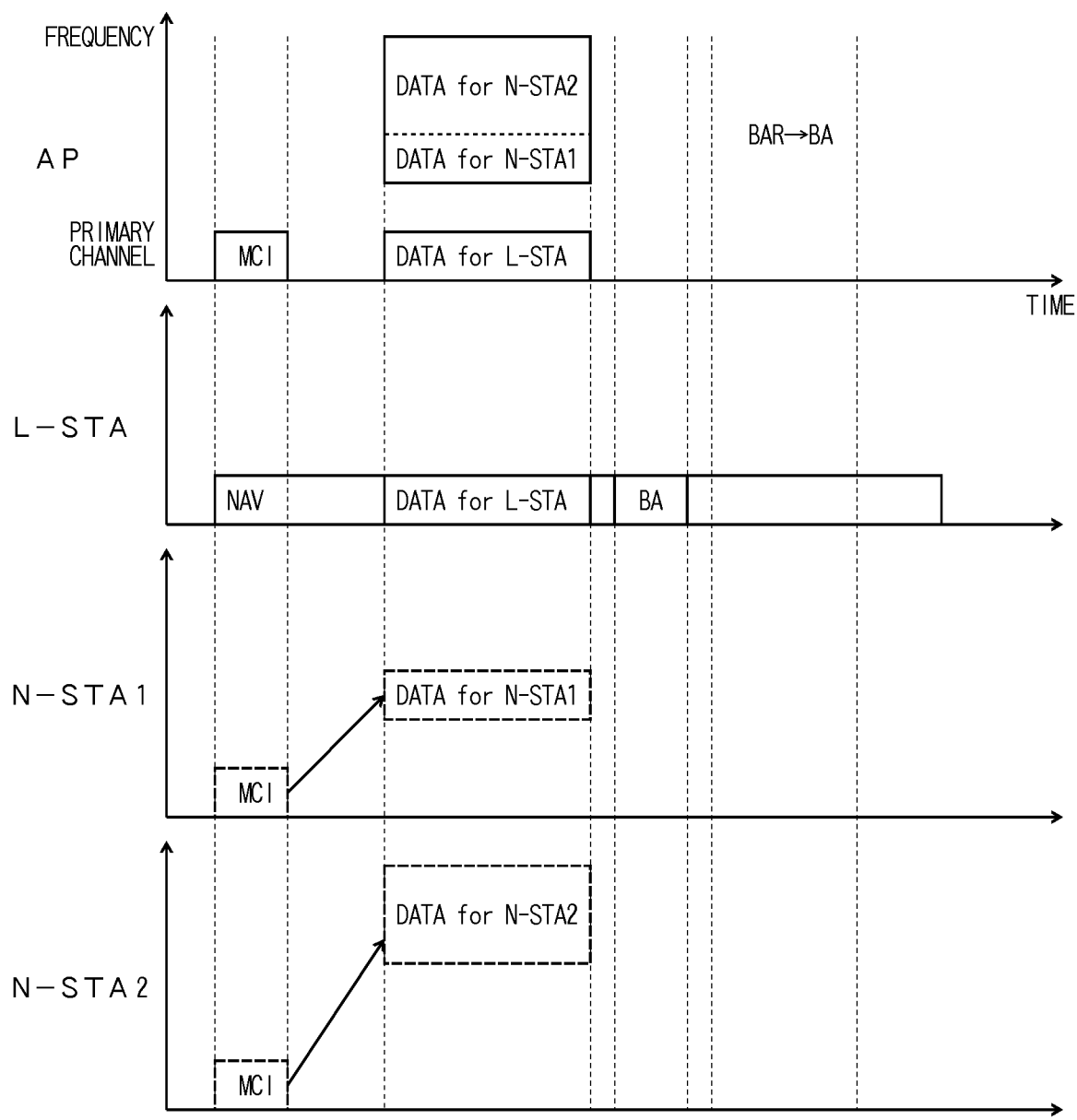
FIG. 3 is a diagram of Embodiment 1-1 of simultaneous transmission control in the wireless communication system according to the present invention.

FIG. 3 illustrates Embodiment 1-1 of a simultaneous transmission control in the wireless communication system according to the present invention. The new standard STA is expressed as an N-STA, and the legacy standard STA is expressed as an L-STA.

In FIG. 3, a case is assumed where the AP performs simultaneous transmissions using the FDMA, regarding as destinations the L-STA that complies with the legacy standards, IEEE 802.11a, IEEE 802.11n, and IEEE 802.11ac, and an N-STA 1 and an N-STA 2 that comply with the new standard, IEEE 802.11ax. Before simultaneously transmitting a data frame using the FDMA, the AP transmits a multi-channel indication frame (hereinafter referred to as an "MCI") in a frame format that is able to be demodulated in the N-STA 1 and the N-STA 2, using the primary channel that is common to the L-STA and the N-STA.

The AP notifies the N-STA 1 and the N-STA 2 of a frequency resource on which the data frame has been received continuously since then using the MCI. For example, because the primary channel is necessarily used in the L-STA for the transmission of the data frame, the frequency resource that is notified to the N-STA 1 and the N-STA 2 using the MCI is in a band that is not occupied by the primary channel and a secondary channel that is used for the L-STA. It is noted that for the frequency resource that is used for the transmission of the data frame by the N-STA 1 and the N-STA 2, channels of 20, 40, 80 and 160 MHz bands that result from combining subchannels on a per-20 MHz basis may be designated, and may not be necessarily available on the per-20 MHz basis. Frame formats of the data frames of the N-STA 1 and the N-STA 2 will be described in detail below in Embodiment 2.

Furthermore, the MCI that is transmitted using the primary channel may be able to be received by the L-STA. The frequency resource that is used by the N-STA 1 and the N-STA 2 is unnecessary for the L-STA, but for example, if information in a duration field is able to be demodulated, a duration that is required for the simultaneous transmissions, which is set for the demodulation, may be set as a network allocation vector NAV.

Figure 4:
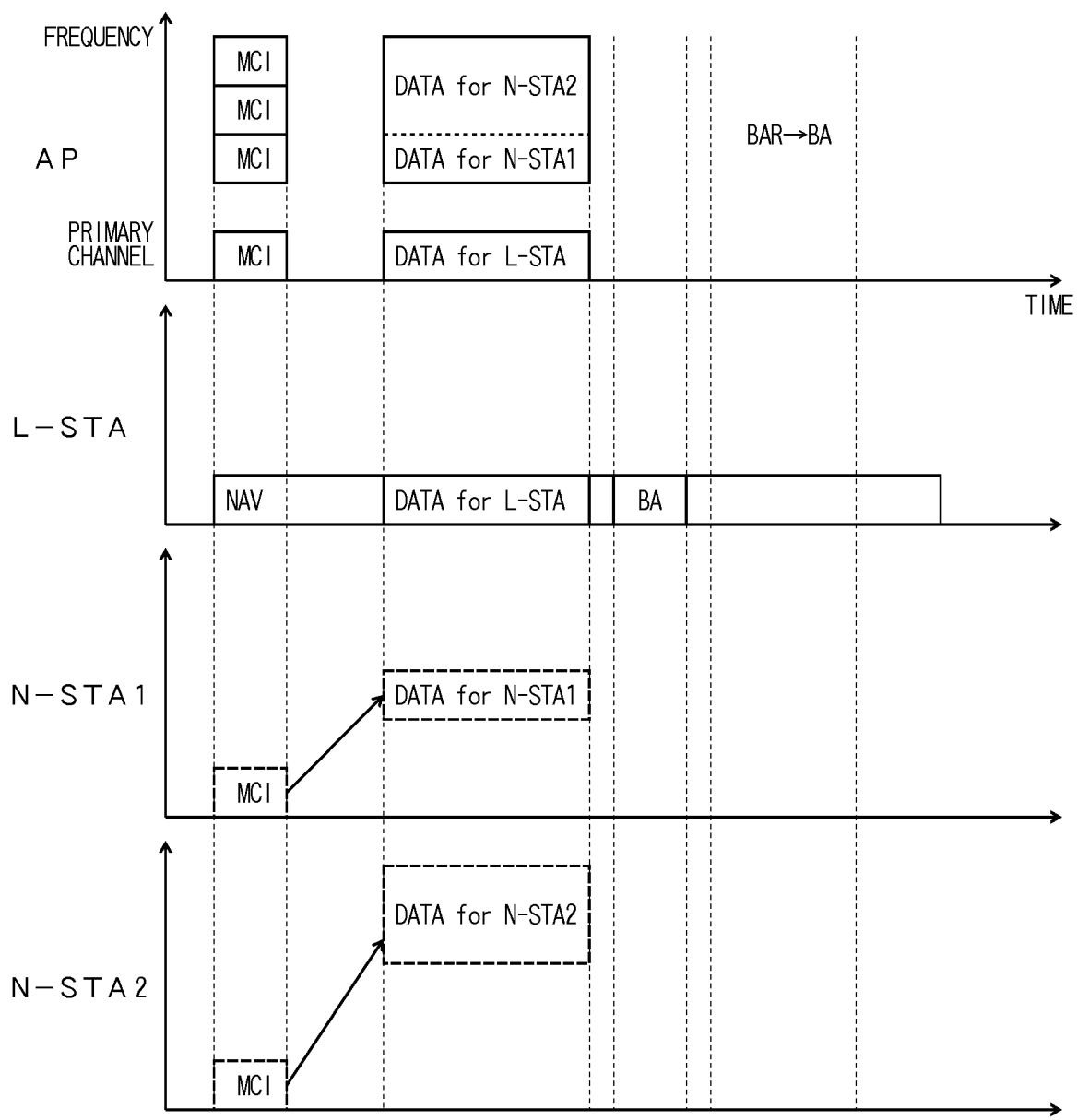
FIG. 4 is a diagram of Embodiment 1-2 of the simultaneous transmission control in the wireless communication system according to the present invention.

Furthermore, the MCI that is transmitted using the primary channel, as illustrated in FIG. 4, may be duplicated on the secondary channel for (side-by-side) transmission, and as a wireless frame in a wideband, may be made to prevent channel interruption. However, the N-STA 1 and the N-STA 2 do not demodulate the MCI on the secondary channel.

Furthermore, as illustrated in FIGS. 3 and 4, a channel that is adjacent to the primary channel may be unoccupied as a guard band. It is noted that the guard band is a band in which interference between each of the frames that are transferred being frequency-multiplexed is avoided, and a bandwidth may be changed according to a frame error occurrence rate on which an amount of interference has an influence. Furthermore, the guard band may be secured over an entire frame time length. However, a portion other than a data portion is not indispensable, and for example, providing to a PHY preamble may not take place. Accordingly, if the L-STA and the N-STA receive the MCI and the data frame in the primary channel with filter characteristics in a narrowband, an influence of loopback self-interference from an adjacent channel can be suppressed.

Figure 5:
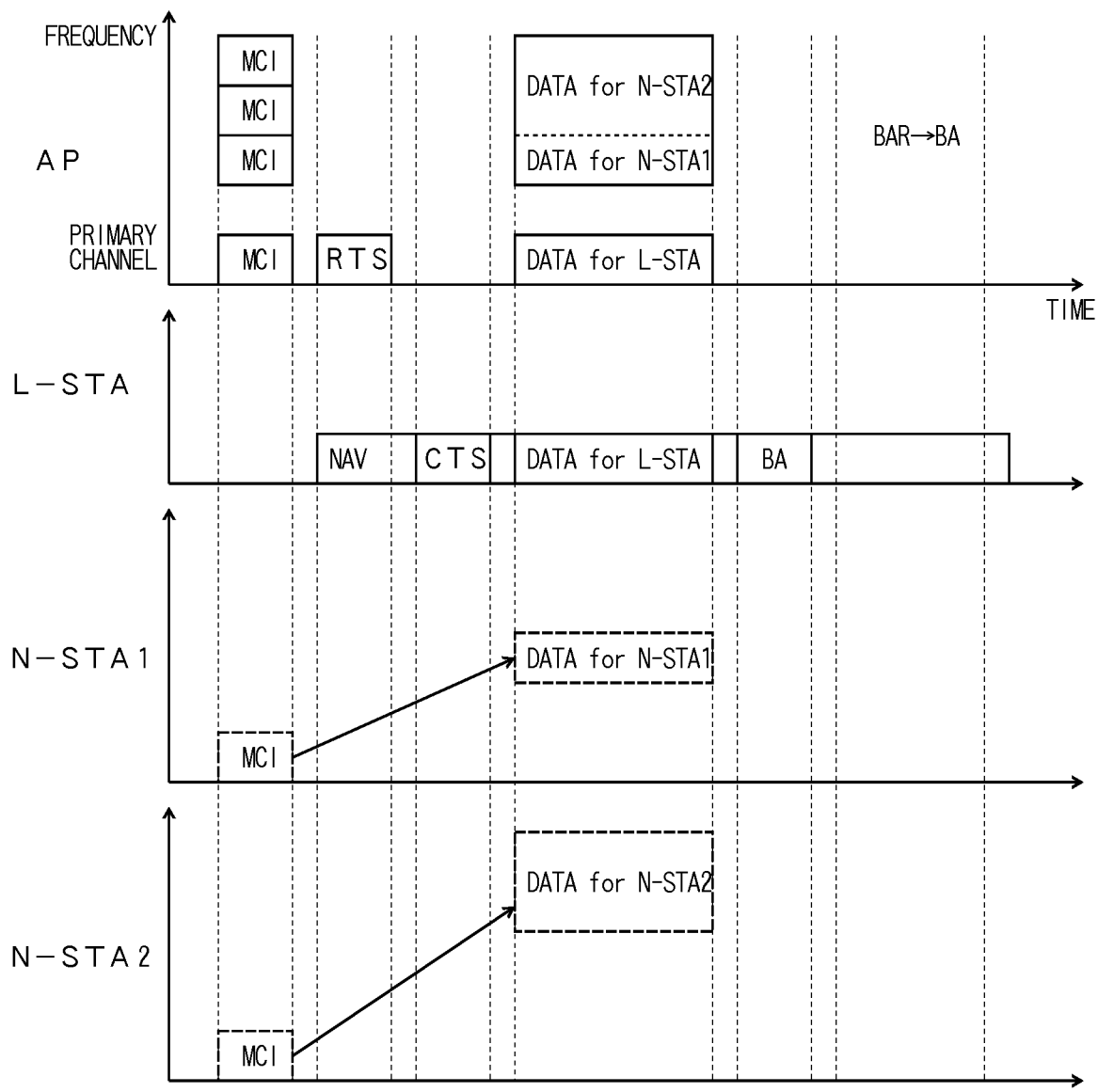
FIG. 5 is a diagram of Embodiment 1-3 of the simultaneous transmission control in the wireless communication system according to the present invention.

Furthermore, after the AP notifies the N-STA 1 and the N-STA 2 of information on the frequency resource that is used for the simultaneous transmissions, using the MCI, as illustrated in FIG. 5, exchange of an RTS/CTS frame may be performed using the primary channel as a measure to cope with a hidden terminal. For example, times that include a time for the exchange of the RTS/CTS frame are set as the time-out that it takes to perform the simultaneous transmissions using channel information that is indicated with the MCI, and thus although there is no data frame that is transmitted immediately after the MCI transmission, notification of channel allocation can be performed.

When the L-STA, the N-STA 1, and the N-STA 2 correctly receive the data frames that are destined for the L-STA, the N-STA 1, and the N-STA 2 themselves, using subchannels that are allocated to the L-STA, the N-STA 1, and the N-STA 2, respectively, the L-STA replies with a BA on the primary channel that is received. A BA that the N-STA replies with is described separately with reference to FIGS. 17 to 20.

In FIG. 5, an example is illustrated where the AP exchanges the RTS/CTS frame, subsequent to the MCI that notifies the information on the frequency resource that is used by the N-STA 1 and the N-STA 2. Here, instead of the MCI and the RTS/CTS frame, exchange of a MU-RTS frame and the CTS frame that has a function of the MCI is described with reference to FIGS. 6 and 7.

Figure 6:
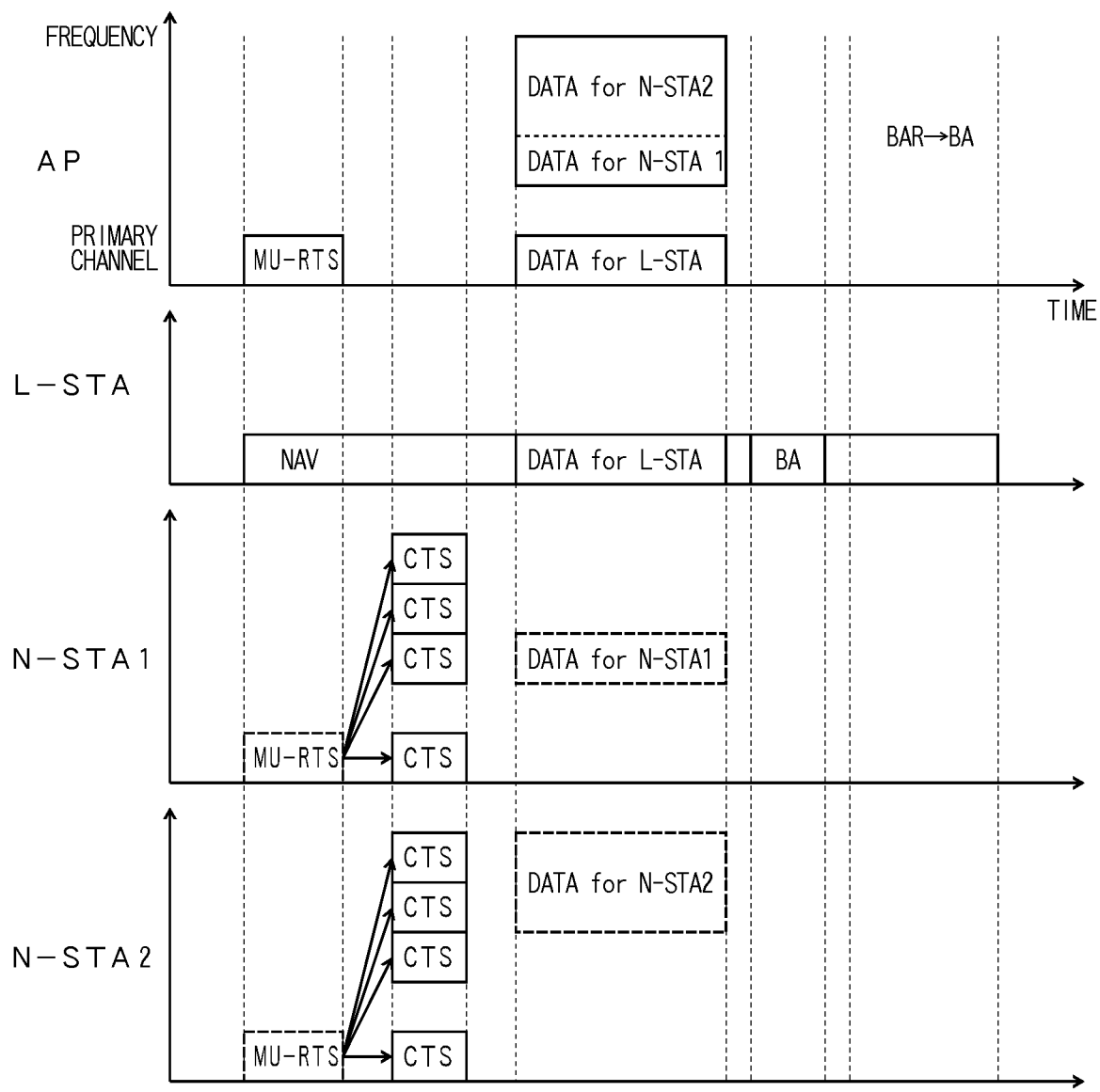
FIG. 6 is a diagram of Embodiment 1-4 of the simultaneous transmission control in the wireless communication system according to the present invention.

In FIG. 6, before simultaneously transmitting the data frame using the FDMA, the AP transmits the MU-RTS frame using the primary channel that is common to the L-STA and the N-STA. The MU-RTS frame not only notifies the L-STA, the N-STA 1, and the N-STA 2 of the information on the frequency resource that is used by each N-STA, using the primary channel, but also has a function of the RTS frame.

The L-STA cannot recognize the MU-RTS frame, and thus disregards the MU-RTS frame. The N-STA 1 and the N-STA 2 transmit the CTS frame on the primary channel and a subchannel that is notified to each of the N-STA 1 and the N-STA 2. That is, the CTS frame is transmitted on all subchannels that are scheduled to be used in the L-STA, the N-STA 1, and the N-STA 2. When the L-STA, the N-STA 1, and the N-STA 2 correctly receive the data frames that are destined for the L-STA, the N-STA 1, and the N-STA 2 themselves, using the subchannels that are allocated to the L-STA, the N-STA 1, and the N-STA 2, respectively, the L-STA replies with the BA on the primary channel that is received. A BA that the N-STA replies with is described separately with reference to FIGS. 17 to 20.

Furthermore, the MU-RTS frame that is transmitted using the primary channel, as illustrated in FIG. 4, may be duplicated side by side on the secondary channel for transmission, and as the wireless frame in the wideband, may be made to prevent the channel interruption.

Figures 7, 8:
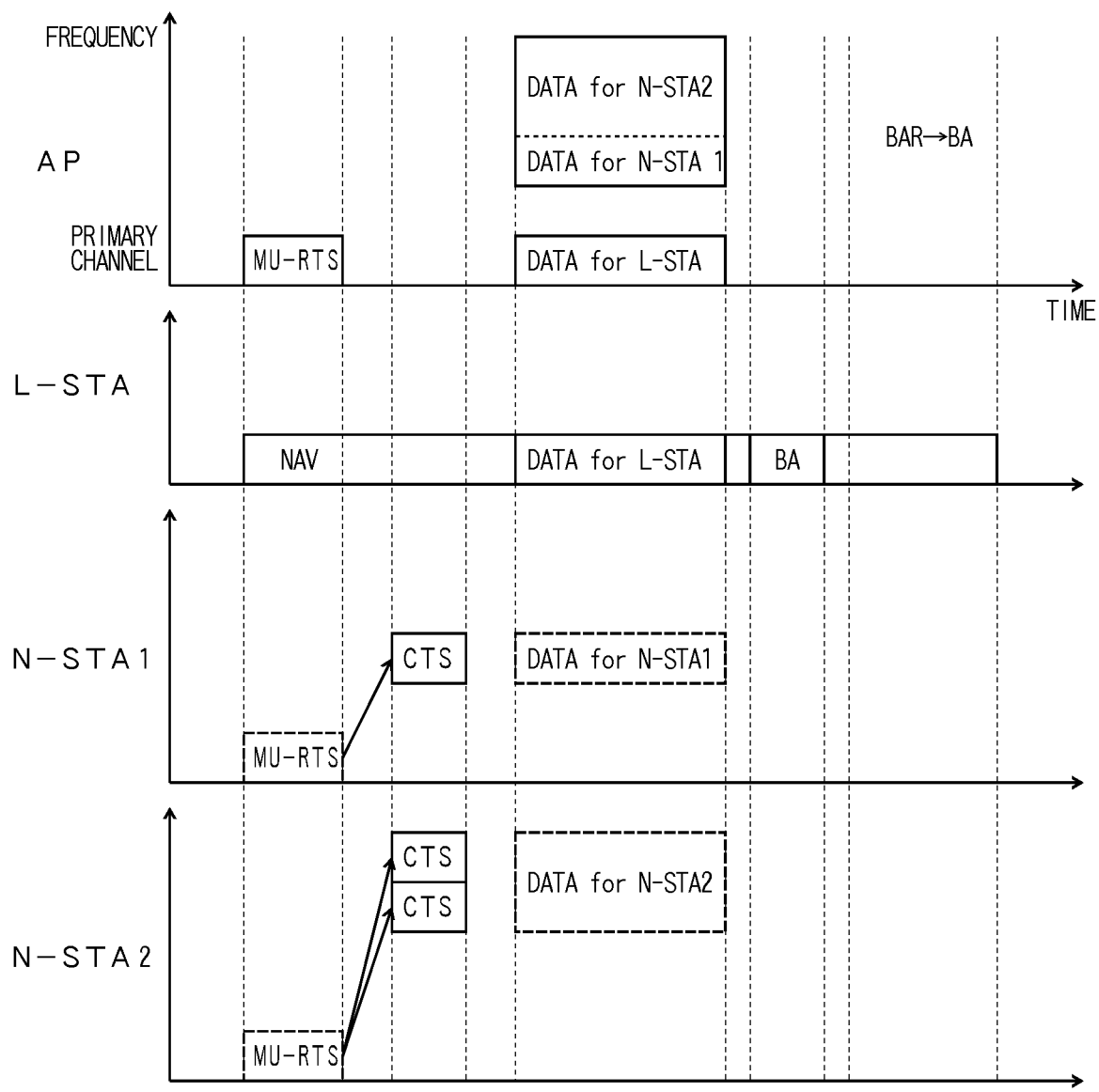
FIG. 7 is a diagram of Embodiment 1-5 of the simultaneous transmission control in the wireless communication system according to the present invention.
FIG. 8 is a diagram illustrating an example of a frame format of a multi-channel indication frame (an MCI).

Furthermore, each of the N-STA 1 and the N-STA 2, as illustrated in FIG. 7, may transmit the CTS frame on the subchannel that is notified by the AP with the MU-RTS frame.

FIG. 8 illustrates an example of a frame format of the multi-channel indication frame (the MCI). It is noted that this is true for the MU-RTS frame, and for example, a trigger frame format that is proposed as the new standard, IEEE 802.11ax, can be used.

In FIG. 8, the MCI is a frame format that is able to be demodulated in the N-STA, this may be satisfactory. The MCI is configured from a frame control field that is the same as a normal MAC frame, a duration field, a receiver address (RA) field, a transmitter address (TA) field, a frame body field, and an FCS field.

The N-STA that performs the simultaneous transmissions using the FDMA and the frequency resource are stored in the frame body field, in a state of being associated with each other.

If a type and a subtype of the present frame are kept in advance within the frame control field in order to be indicated, the RA may be set to be an address of the AP that is a transmission source, and the TA may be omitted.

If a bit sequence for broadcast is set to be in the RA, frequency resources that correspond to a plurality of N-STAs that perform the simultaneous transmissions using the FDMA can be collectively notified. Furthermore, if MAC addresses or Association ID's (AID) of the plurality of N-STAs that perform the simultaneous transmissions using the FDMA are set to be in the RA, frequency resource information that corresponds to each N-STA can be notified in conjunction with frequency resource information in the frame body field. Furthermore, although a group ID (GID) indicating a group of a plurality of N-STAs that performs the simultaneous transmissions using the FDMA is set to be in the RA, the frequency resource information that corresponds to each N-STA can be notified in the same manner.

In FIGS. 3 to 5, it is desirable that frame time lengths of data frames that are simultaneously transmitted are made uniform in such a manner that an influence such as the channel interruption is not exerted. In order to arrange the frame time lengths in order, there are a method of making time lengths of the data frames in the primary channel uniform on a maximum length basis, a method of achieving the uniformity based on the data frame of which the frame time length is maximized, and a method of achieving the uniformity based on the shortest frame time length that is available for unification by adjusting all data frames. In adjusting the frame time length, correspondence is possible with padding, changing of a modulation method, or the like.

(Embodiment 2)

Figure 9:
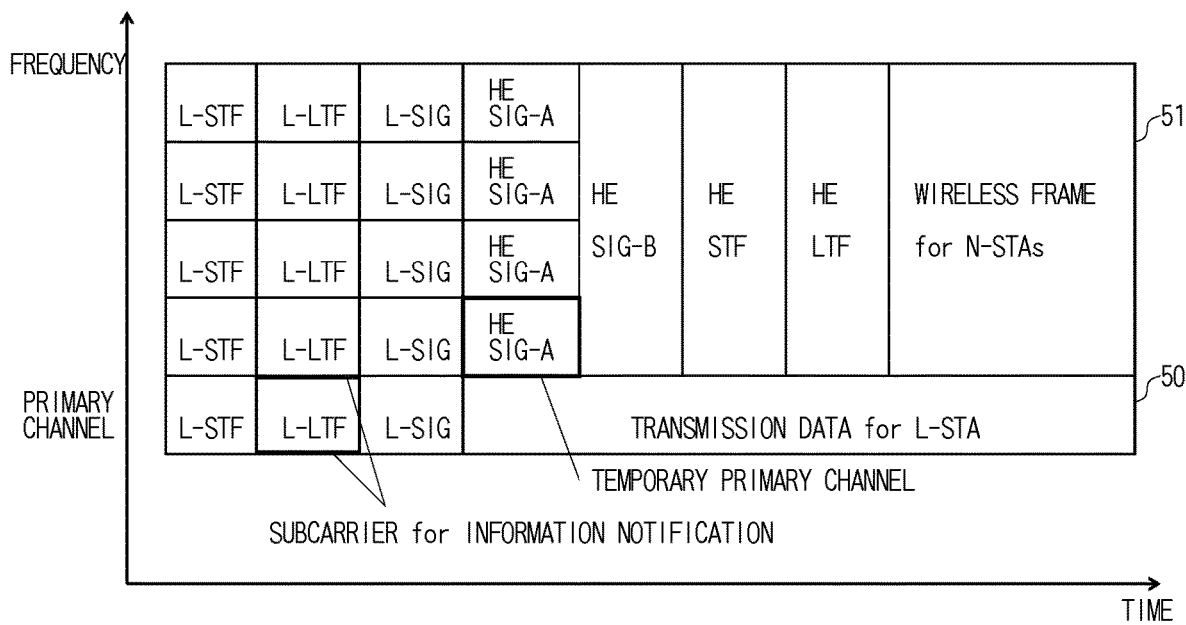
FIG. 9 is a diagram of Embodiment 2-1 of simultaneous transmission control in the wireless communication system according to the present invention.

FIG. 9 illustrates Embodiment 2-1 of the simultaneous transmission control in the wireless communication system according to the present invention.

Here, frame formats of wireless frames 50 and 51 that are simultaneously transmitted to the L-STA and the plurality of N-STAs from the AP using the FDMA are illustrated.

In FIG. 9, the wireless frame 50 is a frame that is transmitted for the L-STA, using the primary channel in a 20 MHz bandwidth. The wireless frame 51 is a frame that is transmitted for each of the plurality of N-STAs, using a frequency resource other than the channel that is allocated to the L-STA. At this point, a subchannel in the 20 MHz bandwidth indicates a frame format for the N-STA, which is transmitted on a channel in an 80 MHz bandwidth, which is four times the subchannel in the 20 MHz bandwidth.

An L-STF, an L-LTF, and an L-SIG of the PHY preamble of the wireless frame 50 for the L-STA are common to the L-STA and the N-STA that are defined in as the standard, IEEE 802.11a, and are able to be demodulated in the L-STA and the N-STA. On the other hand, an L-STF, an L-LTF, and an L-SIG of the PHY preamble of the wireless frame 51 for the N-STA are the same as those of the PHY preamble of the wireless frame 50 for the L-STA, and are transmitted on subchannels in the 20 MHz bandwidth, but are not demodulated in the N-STA that conforms to the primary channel at this point in time.

Figure 10:
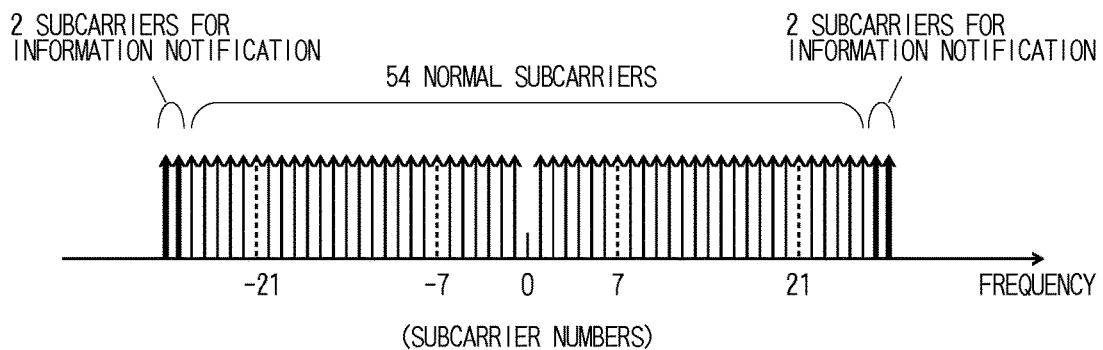
FIG. 10 is a diagram illustrating an example of allocation of subcarriers for an L-LTF in Embodiment 2.

A feature of Embodiment 2 is that a subcarrier for information notification is established for one or more of the L-STF, the L-LTF, and the L-SIG that constitute the PHY preamble of the wireless frame 50 in the primary channel portion. In FIG. 9, it is illustrated that the subcarrier for the information notification is newly established for the L-LTF. The wireless frame 50 notifies a subchannel (hereinafter referred to as a "temporary primary channel") that is used for notification of the channel information that is allocated for the N-STA, using the subcarrier for the information notification. In FIG. 10, an example is illustrated in which two subcarriers for the information notification are allocated outside of a normal allocation of subcarriers for the L-LTF. There are a total of 48 thin-line arrows that are existing data and subcarriers. There are a total of 4 dotted-line arrows that are pilots and subcarriers. There are a total of 4 thick-line arrows that are the subcarriers for the information notification.

It is noted that, as disclosed in Non-Patent Document 3, frequency offset estimation is performed using a known signal, in the L-LTF of the PHY preamble, but according to the present invention, the temporary primary channel on which the channel information that is received in the N-STA is notified is read at the same time as the frequency offset estimation is performed. In a standard for the L-STA, the subcarrier for the information notification that is established for the L-LTF is not prepared, the N-STA that ensures the presence of the subcarrier may not perform reception and demodulation of the L-SIG on the primary channel and, during the reception and the demodulation, may perform channel switching to the temporary primary channel that is notified on the subcarrier.

The N-STA reads the subcarrier for the information notification from the L-LTF that constitutes the PHY preamble of the wireless frame 50 in the primary channel, and switches a channel that is received, from the primary channel to the temporary primary channel. Then, the wireless frame 51 for the N-STA is in the temporary primary channel, and in the high efficiency preamble for the N-STA, the channel information that is notified with a high functionality SIG-A is read here, switching to the wireless frame that is destined for the N-STA takes place, and reception processing of transmission data is performed.

A frame format of the wireless frame 51 for the N-STA will be described below with reference to FIG. 9. The high efficiency preamble for the N-STA follows the L-STF, the L-LTF, and the L-SIG that constitute the PHY preamble of the wireless frame 51. The high efficiency preamble for the N-STA is configured from a high efficiency SIG-A, a high efficiency SIG-B, a high efficiency STF, and a high efficiency LTF.

The high efficiency SIG-A is a field that includes frame information that is common to any one of a case where the simultaneous transmissions to a plurality of N-STAs are performed and a case where a transmission to a single N-STA is performed. The high efficiency SIG-A is allocated to every subchannel in the 20 MHz bandwidth, in a state of being duplicated in all bandwidths. The frame information that is included in the high efficiency SIG-A, for example, is a channel bandwidth of a frame for the N-STA, or the like. The N-STA that demodulates the wireless frame refers to the high efficiency SIG-A on the temporary primary channel that is a subchannel which is indicated by the subcarrier for the information notification, and thus can know a band that the N-STA itself has to demodulate. Additionally, if the high efficiency SIG-B follows the high efficiency SIG-A, MCIS information, the number of OFDM symbols, and the like of the high efficiency SIG-B are included in the high efficiency SIG-A.

Resource allocation when performing the simultaneous transmissions to a plurality of N-STAs using frequency multiplexing or spatial multiplexing is indicated in the high efficiency SIG-B that follows the high efficiency SIG-A. The N-STA that performs demodulation refers to a terminal address, the AID, or the Group ID (GID) that is indicated within the field, and thus can know that a data signal that has to be demodulated in the N-STA itself is mapped to the frequency resource. The high efficiency SIG-B is transmitted using all bandwidths that are indicated with the preceding high efficiency SIG-A. Here, the modulation is performed in such a manner that one field results from an entire 80 MHz bandwidth.

Additionally, the high efficiency STF and the high efficiency LTF that are training signals in the field for the N-STA follow the high efficiency SIG-B. Wireless frames that are destined for a plurality of N-STAs follow the training signal. It is noted that, in order for each field of these to increase delay tolerance to a situation of a propagation path or the like or to train spatial multiplexing transfer, the same thing may be reiterated on a plurality of time axes when necessary.

Figure 11:
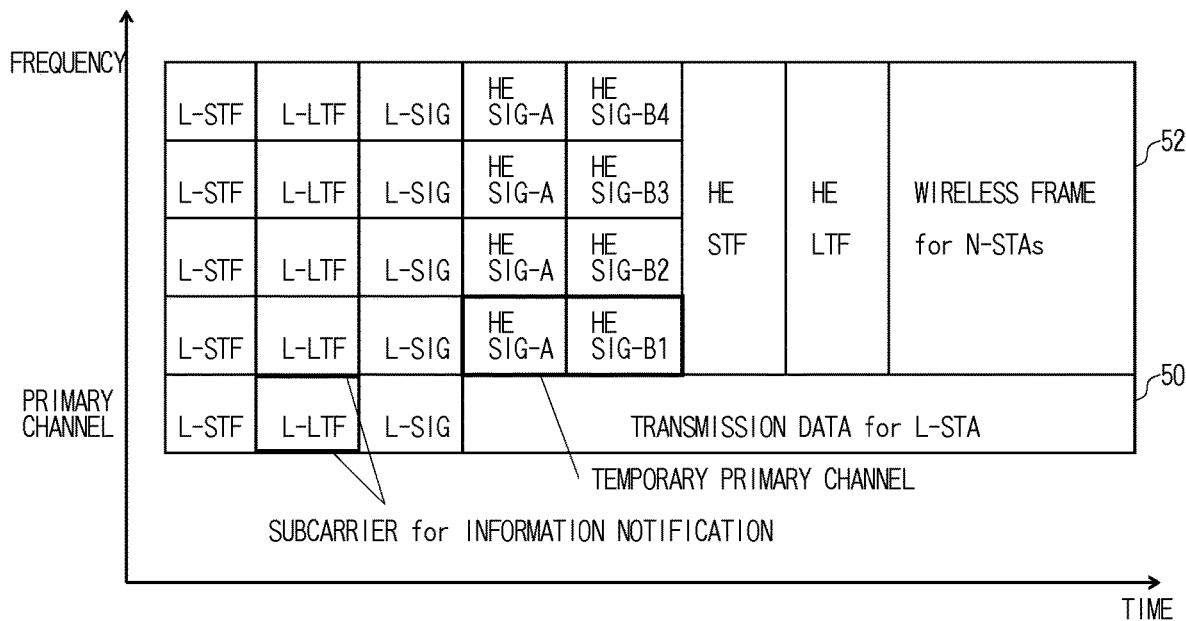
FIG. 11 is a diagram of Embodiment 2-2 of the simultaneous transmission control in the wireless communication system according to the present invention.

FIG. 11 illustrates Embodiment 2-2 of the simultaneous transmission control in the wireless communication system according to the present invention.

The high efficiency SIG-B in Embodiment 2-1 is transmitted in one field using the entire 80 MHz bandwidth, a case of Embodiment 2-2 is that fields are side by side in every 20 MHz bandwidth and a high efficiency SIG-B1 to a high efficiency SIG-B4 result. These have the same symbol length in the same format, but are different from each other in terms of details.

Figure 12:
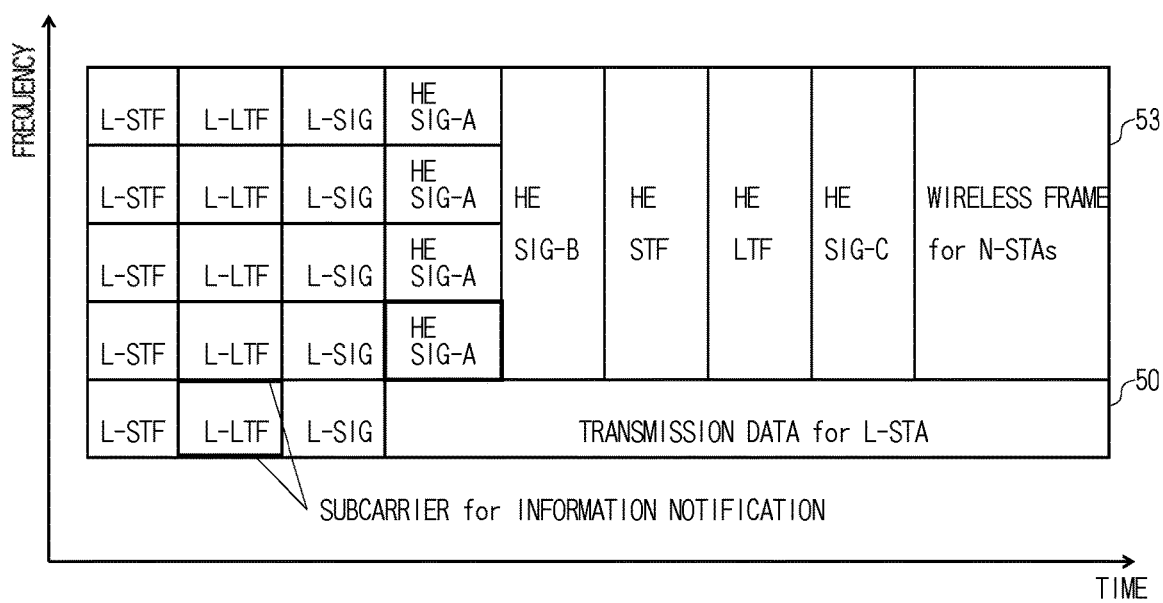
FIG. 12 is a diagram of Embodiment 2-3 of the simultaneous transmission control in the wireless communication system according to the present invention.
Figure 13:
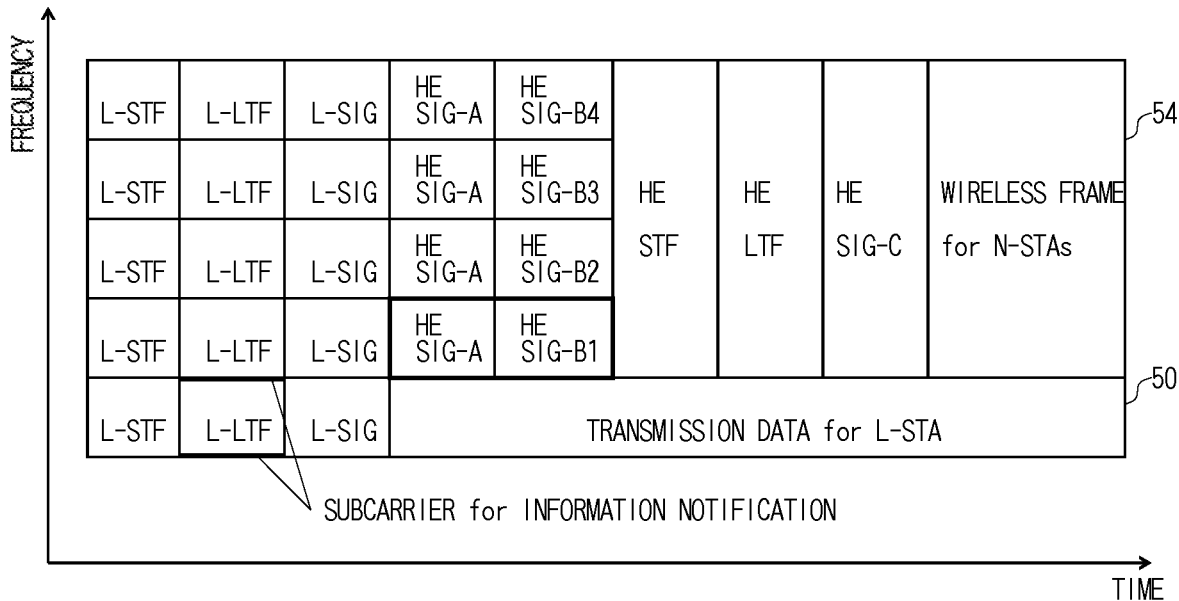
FIG. 13 is a diagram of Embodiment 2-4 of the simultaneous transmission control in the wireless communication system according to the present invention.

FIGS. 12 and 13 illustrate Embodiment 2-3 and Embodiment 2-4 of the simultaneous transmission control in the wireless communication system according to the present invention.

Embodiment 2-3 and Embodiment 2-4 are examples of what results from further including in a frame format a high efficiency SIG-C in which to include information relating to the frequency multiplexing or spatial multiplexing transfer after the high efficiency STF and the high efficiency LTF in Embodiment 2-1 that is illustrated in FIG. 9 and Embodiment 2-2 that is illustrated in FIG. 11. It is noted that, in order for each field of these to increase the delay tolerance to the situation of the propagation path or the like or to train the spatial multiplexing transfer, the same thing may be reiterated on a plurality of time axes when necessary.

Figure 14:
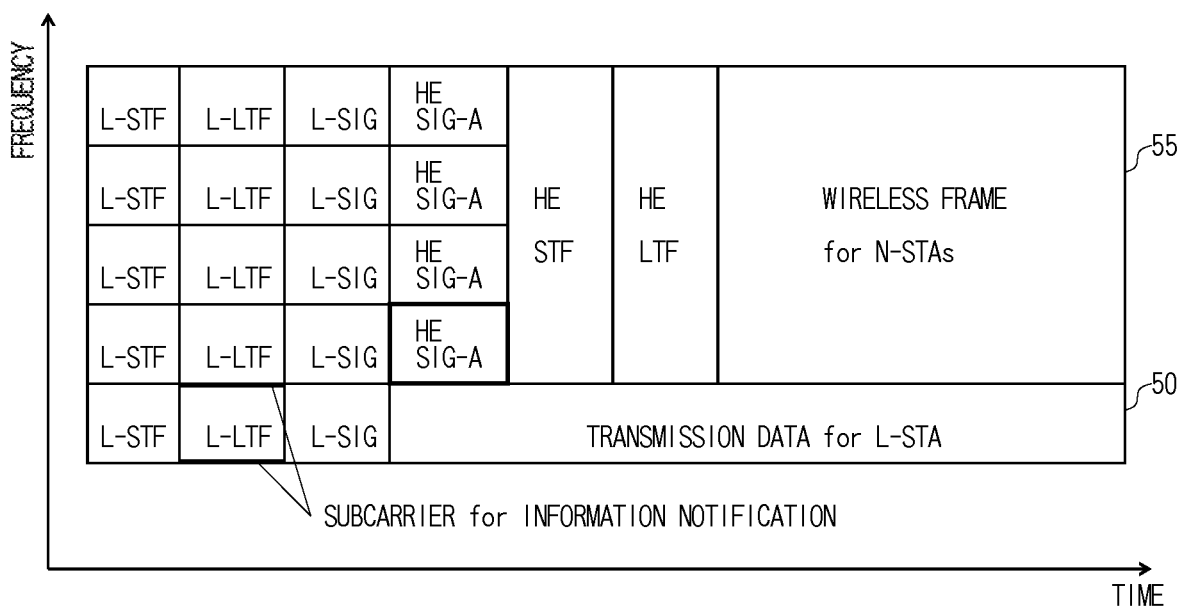
FIG. 14 is a diagram of Embodiment 2-5 of the simultaneous transmission control in the wireless communication system according to the present invention.

FIG. 14 illustrates Embodiment 2-5 of the simultaneous transmission control in the wireless communication system according to the present invention.

Embodiment 2-5 illustrates an example of the frame format that applies if the transmission to a destination that is a single N-STA is performed using the frame format for the N-STA. The frame for the single N-STA doesn't contain the high efficiency SIG-B that includes information for performing the simultaneous transmissions to a plurality of STAs, and contains the high efficiency STF and the high efficiency LTF after the high efficiency SIG-A including common information. It is noted that, in order for each field of these to increase the delay tolerance to the situation of the propagation path or the like or to train the spatial multiplexing transfer, the same thing may be reiterated on a plurality of time axes when necessary.

Figure 15:
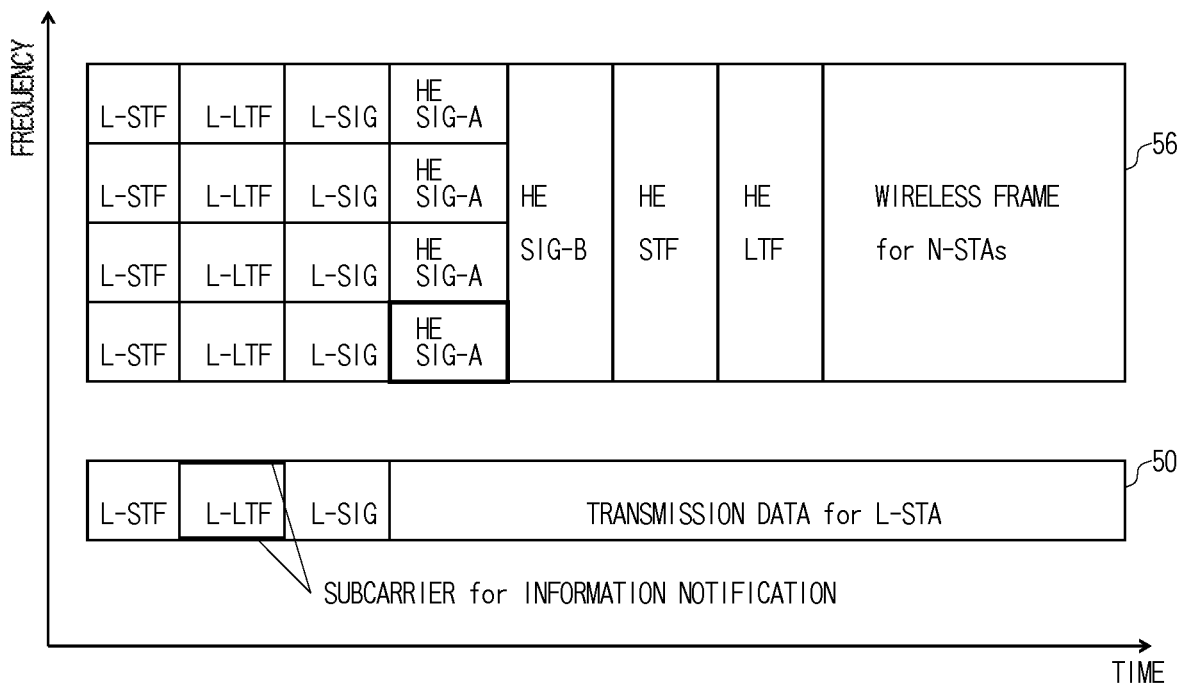
FIG. 15 is a diagram of Embodiment 2-6 of the simultaneous transmission control in the wireless communication system according to the present invention.
Figure 16:
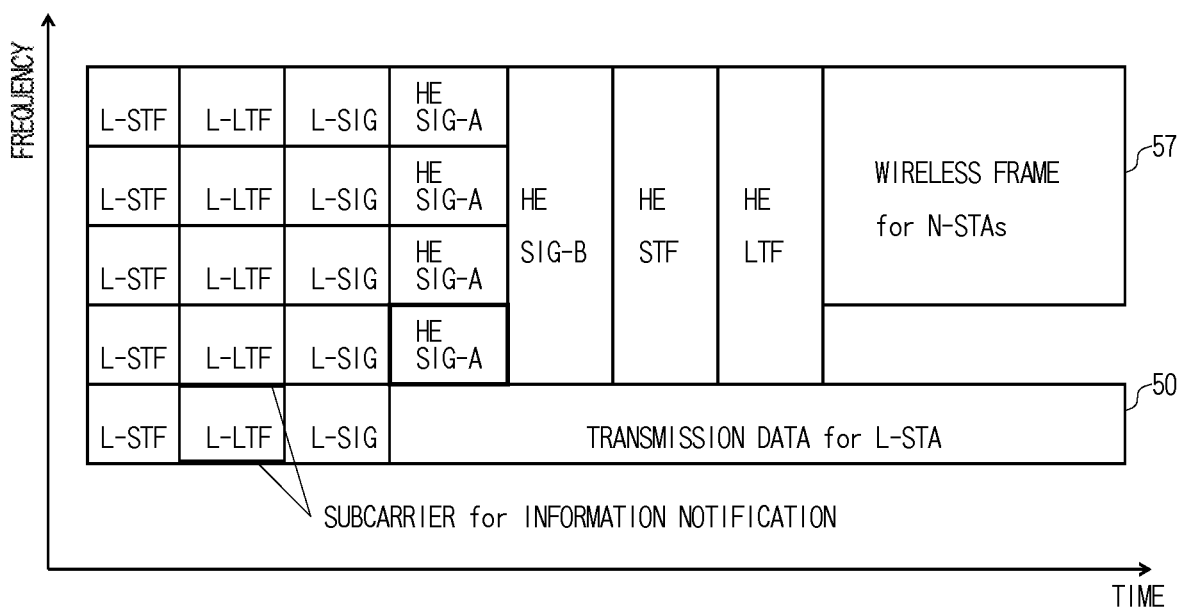
FIG. 16 is a diagram of Embodiment 2-7 of the simultaneous transmission control in the wireless communication system according to the present invention.

In Embodiments 2-1 to 2-5 described above, as illustrated in FIG. 15, the channel that is adjacent to the primary channel may be unoccupied as the guard band. However, the guard band other than the data portion may not be indispensable. For example, as illustrated in FIG. 16, the guard band may be unoccupied in only the wireless frame that is destined for the N-STA, without the guard band being unoccupied in the preamble. Alternatively, the guard band may be unoccupied in the preamble for the N-STA and a portion of the wireless frame that is destined for the N-STA.

Incidentally, in Embodiment 1, the example is described in which the frequency resource on which the frame that is destined for a plurality of N-STAs is received is notified using the MCI, but because the frequency resource information that is allocated to each N-STA is notified using the MCI, the temporary primary channel for receiving the high efficiency preamble for the N-STA, which is described in Embodiment 2, may be designated. In this case, each N-STA reads the temporary primary channel from the MCI in the primary channel, and switched to the temporary primary channel. Then, in the same manner as in Embodiment 2, the channel information that is received in the N-STA is read from the high efficiency preamble for the N-STA in the temporary primary channel, the switching to the channel on which the wireless frame that is destined for each N-STA is received takes place, and the reception processing is performed.

Figure 17:
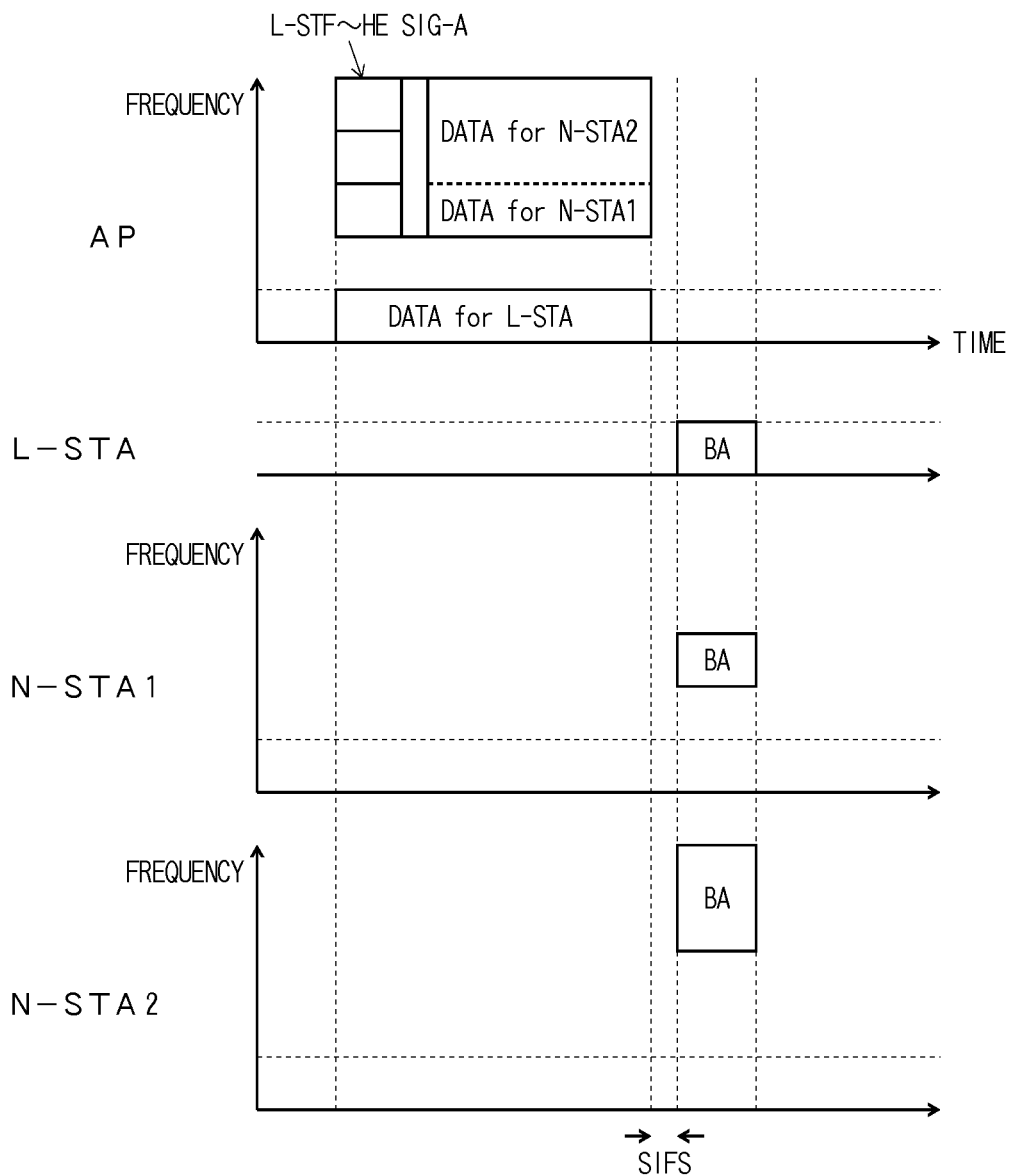
FIG. 17 is a diagram illustrating a first example of a BA transmission procedure in the wireless communication system according to the present invention.

FIG. 17 illustrates a first example of a BA transmission procedure in the wireless communication system according to the present invention.

In FIG. 17, as described in Embodiment 2, the AP transmits the data frame on the channel that is allocated to each of the N-STA and the L-STA. However, in the high efficiency preamble for the N-STA on the temporary primary channel for the frame, for example, in the high functionality SIG-A, the channel that is allocated to the N-STA is notified, and the N-STA reads the high functionality SIG-A, switches a reception channel, and performs the reception. After completing the reception of the data frame, when an SIFS time elapses, the N-STA and the L-STA reply with the BA on the channel on which the data frame is received.

FIG. 18 is a second example of the BA transmission procedure in the wireless communication system according to the present invention.

In FIG. 18, the AP transmits the data frame on the channel that is allocated to each of the N-STA and the L-STA, and receives the BA with which the L-STA replies on the channel on which the data frame is transmitted. Next, the AP transmits a block ACK request (hereinafter referred to as a "BAR") on the channel that is used for the transmission of the data frame, to the N-STA. The N-STA that receives the BAR replies with the BA on the same channel as the N-STA receives the BAR.

At this time, in order to prevent other channel interruption, the BAR that is destined for the N-STA may also be transmitted on the channel that is not used for a destination which is the N-STA and in the guard band that is not used for the destination which is the N-STA. This is true for the BA. When the N-STA replies with the BA on the channel on which the data frame and the BAR that are destined for the N-STA itself are received, the N-STA may also transmit the BA on the channel that is not used for the destination which is the N-STA and in the guard band that is not used for the destination which is the N-STA. However, the guard band may remain unoccupied.

Furthermore, if the number of N-STAs is large and the AP performs the transmission using the FDMA in a frequency band that is smaller than a 20 MHz unit band, or using the FDMA or the MU-MIMO, exchange of the BAR/BA may be reiterated a plurality of times.

Figure 19:
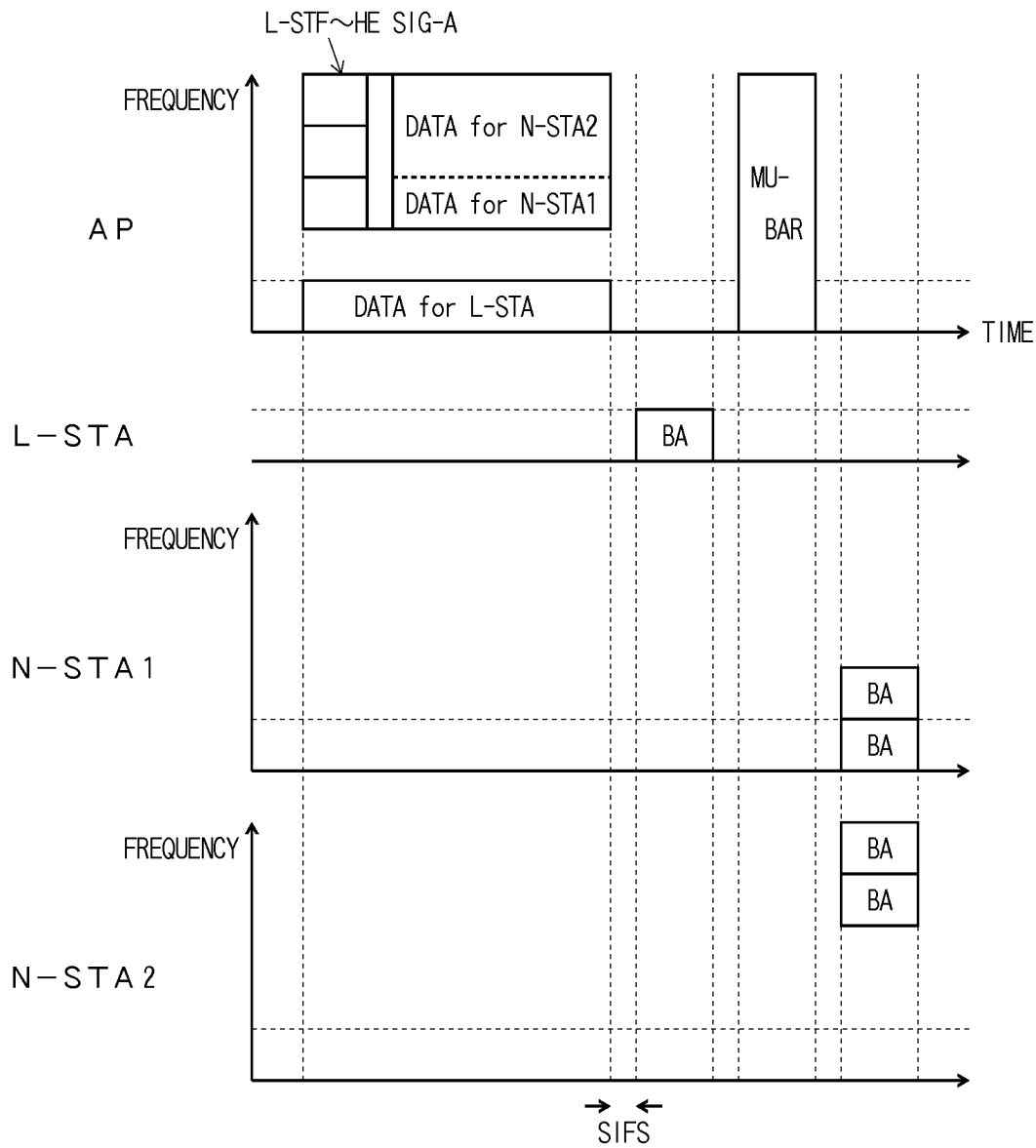
FIG. 19 is a diagram illustrating a third example of the BA transmission procedure in the wireless communication system according to the present invention.

FIG. 19 illustrates a third example of the BA transmission procedure in the wireless communication system according to the present invention.

In FIG. 19, the AP transmits the data frame on the channel that is allocated to each of the N-STA and the L-STA, and receives the BA with which the L-STA replies on the channel (for example, the primary channel) on which the data frame is transmitted. Next, the AP transmits a multi user BAR (hereinafter referred to as an "MU-BAR") in a wideband that covers all channels, to the N-STA. Stated in the MU-BAR are an address of the N-STA that makes a request to the AP for the transmission of the BA, and information on a frequency resource for the BA transmission, which is allocated to each N-STA. The frequency resource for the BA transmission is able to be set independently of the channel on which each N-STA transmits the data frame. Furthermore, the MU-BAR also has a function of a trigger frame that is synchronized to a timing of the BA which is transmitted by each N-STA.

The N-STA that receives the MU-BAR checks whether or not the N-STA itself is designated as a destination, and if designated, recognizes the channel on which the N-STA itself transmits the BA, from the allocated frequency resource. Additionally, a timing is adjusted or frequency synchronization is performed referring to a signal that is the MU-BAR, and after the reception is complete, subsequent to an SIFS, the BA is transmitted on the designated channel.

It is noted that the BA may be transmitted, for example, on a 20 MHz unit channel, and may also be simultaneously transmitted on another channel in order to prevent the channel interruption from another STA. Furthermore, if necessary, the guard band may be unoccupied between each of the BAs that are transmitted by the N-STAs and thus interference between each of the BAs may be suppressed. Furthermore, if the number of N-STAs is large and the AP performs the transmission using the FDMA in a frequency band that is smaller than a 20 MHz unit band, or using the FDMA or the MU-MIMO, exchange of the MU-BAR/BA may be reiterated a plurality of times.

Figure 20:
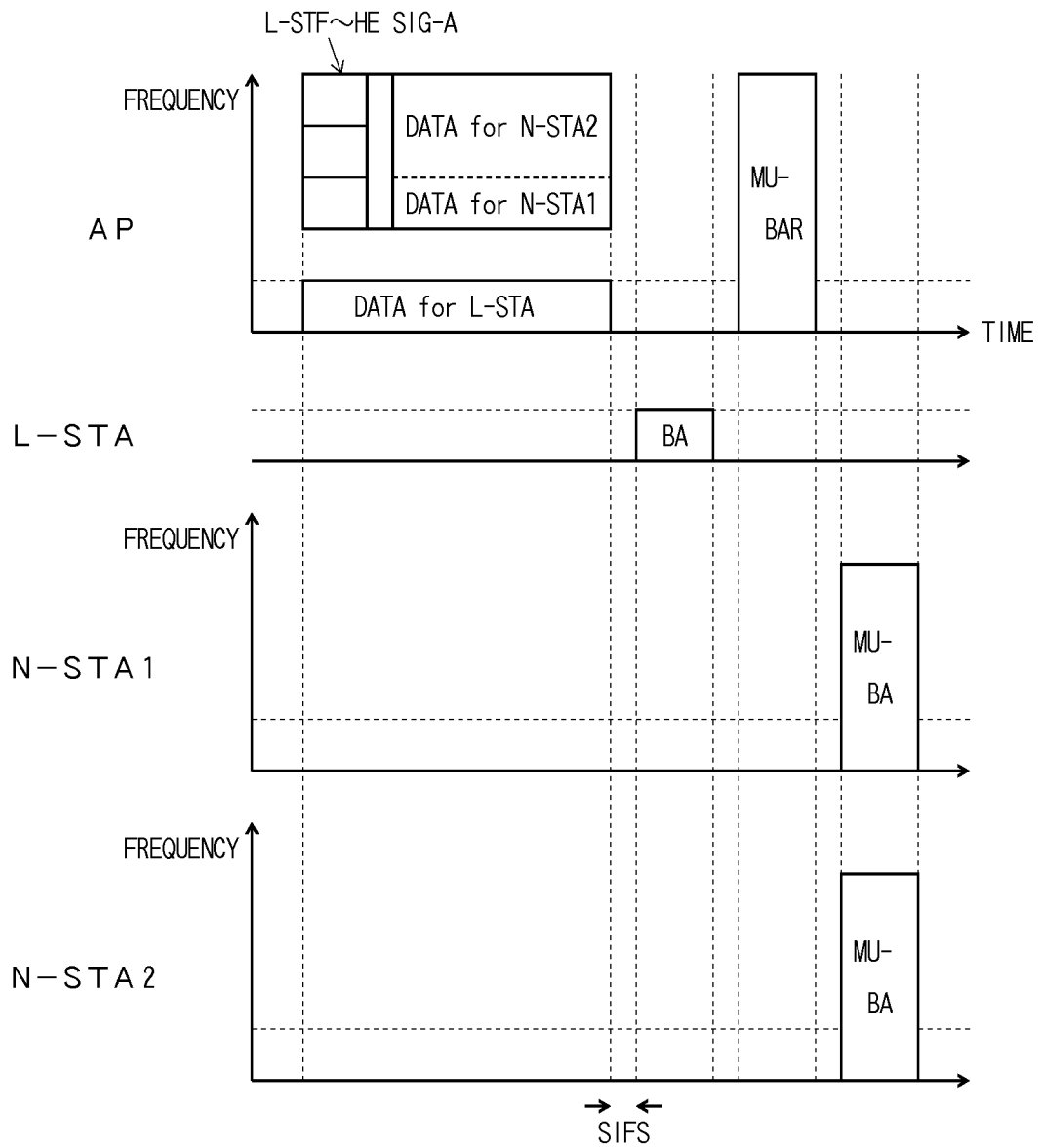
FIG. 20 is a diagram illustrating a fourth example of the BA transmission procedure in the wireless communication system according to the present invention.
Figure 22:
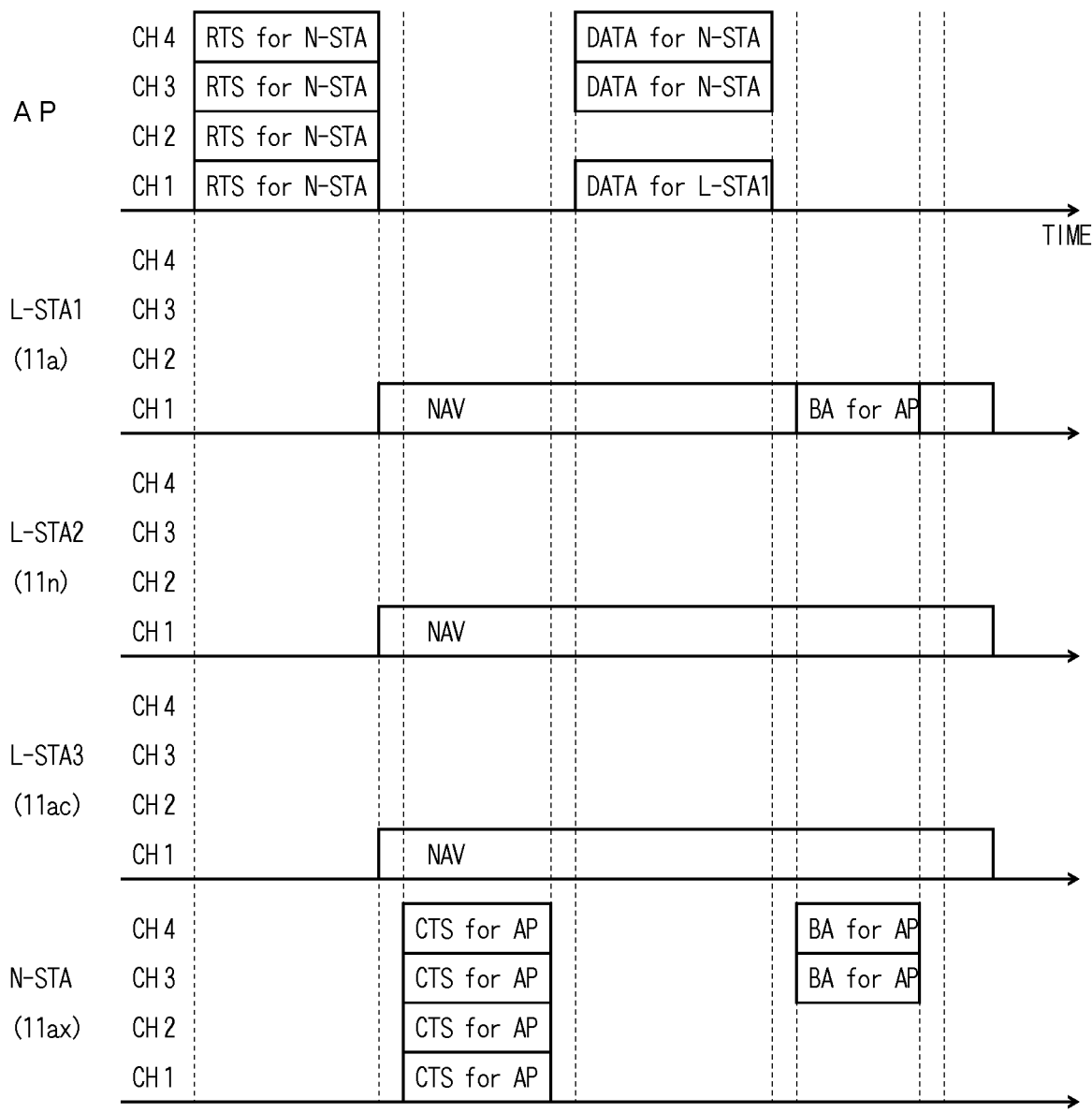
FIG. 22 is a diagram illustrating an example in which simultaneous transmissions from an AP to a plurality of STAs, which use FDMA, are performed.

FIG. 20 illustrates a fourth example of the BA transmission procedure in the wireless communication system according to the present invention.

In FIG. 20, the fourth example of the BA transmission procedure is the same as the third example of the BA transmission procedure that is illustrated in FIG. 19, until the AP transmits the MU-BAR to a destination that is the N-STA.

The N-STA that receives the MU-BAR checks whether or not the N-STA itself is designated as a destination, and if designated, recognizes the channel on which the N-STA itself transmits the BA, from the allocated frequency resource. Additionally, the timing is adjusted or the frequency synchronization is performed referring to a signal that is the MU-BAR, and after the reception is complete, subsequent to the SIFS, a multiuser BA (hereinafter referred to an "MU-BA") is transmitted on the designated channel.

The MU-BA that is transmitted by each N-STA uses the same frame format as the frame format that is destined for the N-STA which is described in Embodiment 2. The L-STF to the high efficiency SIG-A, which constitute the common preambles, are transmitted being superimposed on a time and a frequency. Thereafter, BA information is transferred on the frequency resource that is allocated to each N-STA.

The many features and advantages of the embodiments are apparent from the detail specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A wireless communication system in which a wireless LAN access point (hereinafter referred to as an "AP") and a plurality of wireless LAN stations (each of which is hereinafter referred to as an "STA") are connected to each other and the AP simultaneously transmits a wireless frame destined for each STA with frequency division multiple access, wherein the AP includes:
a control frame transmission unit that generates a control frame having information of a subchannel on which the each STA receives a high efficiency preamble of the wireless frame and transmits the control frame on a primary channel being used in a shared manner by the each STA; and
a wireless frame transmission unit that sets information of a frequency resource allocated to the each STA to the high efficiency preamble and simultaneously transmits the wireless frame destined for the each STA on the frequency resource allocated to the each STA, and the STA includes
a frequency resource selection reception unit that receives the control frame on the primary channel, switches to the subchannel notified by the control frame, demodulates the high efficiency preamble of the wireless frame on the subchannel, switches to the frequency resource notified by the high efficiency preamble, and receives a wireless frame destined for the STA itself on the frequency resource, where the subchannel and the frequency resource are not shared by each STA and the subchannel differs from the frequency resource switched to by the frequency resource selection reception unit.

2. The wireless communication system according to claim 1, wherein
the high efficiency preamble of the wireless frame includes:
a first high efficiency preamble that is used for notification of a band in which the each STA demodulates the wireless frame; and
a second high efficiency preamble that is used for notification of allocation of the frequency resource allocated to the each STA which is simultaneously transmitted with one of frequency multiplexing and spatial multiplexing, and
the second high efficiency preamble is transmitted in one of a bandwidth of the subchannel and a full bandwidth used for the transmission of the wireless frame.

3. The wireless communication system of claim 1 wherein the subchannel has a bandwidth of 20 MHz.

4. A wireless communication system in which a wireless LAN access point (hereinafter referred to as an "AP") and a plurality of wireless LAN stations (each of which is hereinafter referred to as an "STA") are connected to each other and the AP simultaneously transmits a wireless frame destined for each STA with frequency division multiple access, wherein the AP includes:
a subcarrier information notification unit that adds a subcarrier for information notification which is different from a prescribed subcarrier to a PHY preamble of a wireless frame on a primary channel being used in a shared manner by the each STA, and notifies information of a subchannel on which the each STA receives a high efficiency preamble of the wireless frame by the subcarrier for the information notification; and
a wireless frame transmission unit that sets information of a frequency resource allocated to the each STA to the high efficiency preamble and simultaneously transmits the wireless frame destined for the each STA on the frequency resource allocated to the each STA, and the STA includes
a frequency resource selection reception unit that detects the subcarrier for the information notification of the PHY preamble of the wireless frame on the primary channel, switches to the subchannel notified by the subcarrier for the information notification, demodulates the high efficiency preamble of the wireless frame on the subchannel, switches to the frequency resource notified by the high efficiency preamble, and receives a wireless frame destined for the STA itself on the frequency resource, where the subchannel and the frequency resource are not shared by each STA and the subchannel differs from the frequency resource switched to by the frequency resource selection reception unit.

5. The wireless communication system according to claim 4, wherein
the PHY preamble is configured with legacy standards an L-STF, an L-LTF, and an L-SIG and the subcarrier for the information notification is added to at least one field of the L-STF, the L-LTF, and the L-SIG.

6. A wireless communication method in which a wireless LAN access point (hereinafter referred to as an "AP") and a plurality of wireless LAN stations (each of which is hereinafter referred to as an "STA") are connected to each other and the AP simultaneously transmits a wireless frame destined for each STA with frequency division multiple access, wherein the AP includes:
a control frame transmission step generating a control frame having information of a subchannel on which the each STA receives a high efficiency preamble of the wireless frame and transmitting the control frame on a primary channel being used in a shared manner by the each STA; and
a wireless frame transmission step setting information of a frequency resource allocated to the each STA to the high efficiency preamble and simultaneously transmitting the wireless frame destined for the each STA on the frequency resource allocated to the each STA, and the STA includes
a frequency resource selection reception step receiving the control frame on the primary channel, switching to the subchannel notified by the control frame, demodulating the high efficiency preamble of the wireless frame on the subchannel, switching to the frequency resource notified by the high efficiency preamble, and receiving a wireless frame destined for the STA itself on the frequency resource, where the subchannel and the frequency resource are not shared by each STA and the subchannel differs from the frequency resource switched to by the frequency resource selection reception unit.

7. The wireless communication method according to claim 6, wherein the high efficiency preamble of the wireless frame includes:
a first high efficiency preamble that is used for notification of a band in which the each STA demodulates the wireless frame; and
a second high efficiency preamble that is used for notification of allocation of the frequency resource allocated to the each STA which is simultaneously transmitted with one of frequency multiplexing and spatial multiplexing, and
the second high efficiency preamble is transmitted in one of a bandwidth of the subchannel and a full bandwidth used for the transmission of the wireless frame.

8. A wireless communication method in which a wireless LAN access point (hereinafter referred to as an "AP") and a plurality of wireless LAN stations (each of which is hereinafter referred to as an "STA") are connected to each other and the AP simultaneously transmits a wireless frame destined for each STA with frequency division multiple access, wherein
the AP includes:
a subcarrier information notification step adding a subcarrier for information notification which is different from a prescribed subcarrier to a PHY preamble of a wireless frame on a primary channel being used in a shared manner by the each STA, and notifying information of a subchannel on which the each STA receives a high efficiency preamble of the wireless frame by the subcarrier for the information notification; and
a wireless frame transmission step setting information of a frequency resource allocated to the each STA to the high efficiency preamble and simultaneously transmitting the wireless frame destined for the each STA on the frequency resource allocated to the each STA, and
the STA includes
a frequency resource selection reception step detecting the subcarrier for the information notification of the PHY preamble of the wireless frame on the primary channel, switching to the subchannel notified by the subcarrier for the information notification, demodulating the high efficiency preamble of the wireless frame on the subchannel, switching to the frequency resource notified by the high efficiency preamble, and receiving a wireless frame destined for the STA itself on the frequency resource, where the subchannel and the frequency resource are not shared by each STA and the subchannel differs from the frequency resource switched to by the frequency resource selection reception unit.

9. The wireless communication method according to claim 8, wherein
the PHY preamble is configured with legacy standards an L-STF, an L-LTF, and an L-SIG and the subcarrier for the information notification is added to at least one field of the L-STF, the L-LTF, and the L-SIG.

10. A wireless LAN access point in a wireless communication system in which the wireless LAN access point and a plurality of wireless LAN stations (each of which is hereinafter referred to as an "STA") are connected to each other and a wireless frame destined for each STA is transmitted with frequency division multiple access, the wireless LAN access point comprising:
a control frame transmission unit that generates a control frame having information of a subchannel on which the each STA receives a high efficiency preamble of the wireless frame and transmits the control frame on a primary channel being used in a shared manner by the each STA; and
a wireless frame transmission unit that sets information of a frequency resource allocated to the each STA to the high efficiency preamble and simultaneously transmits the wireless frame destined for the each STA on the frequency resource allocated to the each STA, where the subchannel and the frequency resource are not shared by each STA and the subchannel differs from the frequency resource.

11. A wireless LAN access point in a wireless communication system in which a wireless LAN access point and a plurality of wireless LAN stations (each of which is hereinafter referred to as an "STA") are connected to each other and a wireless frame destined for each STA is transmitted with frequency division multiple access, the wireless LAN access point comprising:
a subcarrier information notification unit that adds a subcarrier for information notification which is different from a prescribed subcarrier to a PHY preamble of a wireless frame on a primary channel being used in a shared manner by the each STA, and notifies information of a subchannel on which the each STA receives a high efficiency preamble of the wireless frame by the subcarrier for the information notification; and
a wireless frame transmission unit that sets information of a frequency resource allocated to the each STA to the high efficiency preamble and simultaneously transmits the wireless frame destined for the each STA on the frequency resource allocated to the each STA, where the subchannel and the frequency resource are not shared by each STA and the subchannel differs from the frequency resource.

12. Wireless LAN stations in a wireless communication system in which a wireless LAN access point (hereinafter referred to as an "AP") and a plurality of wireless LAN stations are connected to each other and the AP simultaneously transmits a wireless frame destined for each of the wireless LAN stations with frequency division multiple access, the wireless LAN stations comprising:
a processor;
a storage medium having computer program instructions stored thereon, wherein the computer program instructions, when executed by the processor, perform processing of:
a frequency resource selection reception unit that receives a control frame transmitted from the AP on a primary channel being used in a shared manner by the each of the wireless LAN stations, switches to a subchannel notified by the control frame, demodulates a high efficiency preamble of the wireless frame on the subchannel, switches to the frequency resource notified by the high efficiency preamble, and receives a wireless frame destined for the each of the wireless LAN stations itself on the frequency resource, where the subchannel and the frequency resource are not shared by each STA and the subchannel differs from the frequency resource switched to by the frequency resource selection reception unit.

13. Wireless LAN stations in a wireless communication system in which a wireless LAN access point (hereinafter referred to as an "AP") and a plurality of wireless LAN stations are connected to each other and the AP simultaneously transmits a wireless frame destined for each of the wireless LAN stations with frequency division multiple access, the wireless LAN stations comprising:

a processor;
a storage medium having computer program instructions stored thereon, wherein the computer program instructions, when executed by the processor, perform processing of:
a frequency resource selection reception unit that detects a subcarrier for information notification of a PHY preamble of the wireless frame transmitted from the AP on a primary channel being used in a shared manner by the each of the wireless LAN stations, switches to a subchannel notified by the subcarrier for the information notification, demodulates a high efficiency preamble of the wireless frame on the subchannel, switches to the frequency resource notified by the high efficiency preamble, and receives a wireless frame destined for the each of the wireless LAN stations itself on the frequency resource, where the subchannel and the frequency resource are not shared by each STA and the subchannel differs from the frequency resource switched to by the frequency resource selection reception unit.

\* \* \* \* \*